(12) United States Patent
Sarwat et al.

(10) Patent No.: US 12,485,779 B1
(45) Date of Patent: Dec. 2, 2025

(54) STRUCTURE-BASED METHODS TO MITIGATE VOLTAGE FLUCTUATIONS IN DYNAMIC WIRELESS POWER TRANSFER FOR ELECTRIC VEHICLES

(71) Applicants: Arif I. Sarwat, Miami, FL (US); Milad Behnamfar, Miami, FL (US)

(72) Inventors: Arif I. Sarwat, Miami, FL (US); Milad Behnamfar, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/262,957

(22) Filed: Jul. 8, 2025

(51) Int. Cl.
| | |
|---|---|
| *B60L 53/122* | (2019.01) |
| *B60L 53/30* | (2019.01) |
| *B60L 53/62* | (2019.01) |
| *B60L 53/67* | (2019.01) |
| *H02J 50/12* | (2016.01) |
| *H02J 50/40* | (2016.01) |

(52) U.S. Cl.
CPC ............. *B60L 53/122* (2019.02); *B60L 53/32* (2019.02); *B60L 53/62* (2019.02); *B60L 53/67* (2019.02); *H02J 50/12* (2016.02); *H02J 50/40* (2016.02); *B60L 2210/30* (2013.01); *B60L 2210/40* (2013.01)

(58) Field of Classification Search
CPC ........ H02J 50/005; H02J 50/12; H02J 50/402; H02J 50/90; B60L 53/122; B60L 53/39
See application file for complete search history.

(56) References Cited

U.S. PATENT DOCUMENTS

| 11,936,206 B1 * | 3/2024 | Sarwat | B60L 53/32 |
| 2024/0006928 A1 * | 1/2024 | Inoue | B60L 53/39 |

FOREIGN PATENT DOCUMENTS

| CN | 116160882 A * | 5/2023 | B60L 53/122 |

* cited by examiner

*Primary Examiner* — Julian D Huffman
*Assistant Examiner* — Sadia Kousar
(74) *Attorney, Agent, or Firm* — SALIWANCHIK, LLOYD & EISENSCHENK

(57) ABSTRACT

Methods and systems for dynamic wireless power transfer to charge an electric vehicle (EV) in motion are provided. The method can include: transmitting wireless power from a plurality of main transmitter coils; transmitting wireless power from a assisted coil disposed between each pair of adjacent main transmitter coils; receiving the wireless power at a receiver coil when the electric vehicle is charged in motion; providing a primary compensation network coupled to the main transmitter coils and the assisted coils; and compensating for reactive power at a secondary side by a secondary compensation network coupled to the receiver coil. Dimensions and positions of the assisted coils and parameters of the compensation network are configured to maintain a substantially constant mutual inductance profile between the transmitter coils and the receiver coil when the electric vehicle is charged in motion, thereby reducing power pulsation and providing a stable output voltage to the battery of the EV.

16 Claims, 26 Drawing Sheets

(a) $n_a = 3$ (b) $n_a = 4$ (a) Position 0mm (a) Physical visualization of different positions

TRANSMITTER AND RECEIVER COUPLER DIMENSIONS

| Parameter | Description | Value |
| --- | --- | --- |
| $l_{AL}$ | Main coil aluminum plate length | 410 mm |
| $w_{AL}$ | Main coil aluminum plate width | 410 mm |
| $l_{nfe}$ | Main coil ferrite plate length | 370 mm |
| $w_{nfe}$ | Main coil ferrite plate width | 370 mm |
| $l_{oc}, w_{oc}$ | Main coil's outer length and width | 300 mm |
| $l_{ic}, w_{ic}$ | Main coil's inner length and width | 234 mm |
| $l_{afe}$ | Assisted ferrite plate length | 300 mm |
| $w_{afe}$ | Assisted ferrite plate width | 40 mm |
| $l_{ao}$ | Assisted coil's outer length | 300 mm |
| $w_{ao}$ | Assisted coil's outer width | 50 mm |
| $l_{ai}$ | Assisted coil's inner length | 180 mm |
| $w_{ai}$ | Assisted coil's inner width | 24 mm |
| $d$ | airgap | 150 mm |

FIG. 19

CIRCUIT PARAMETERS

| Parameter | Description | value |
|---|---|---|
| $L_{p1}, \ldots, L_{pn}$, and $L_s$ | Self-inductance of main transmitter coils and receiver coil | $50\mu H$ |
| $L_{a1}, \ldots, L_{an}$ | Self-inductance of assisted transmitter coils | $10\mu H$ |
| $L_{fp1}, \ldots, L_{fpn}$ and $L_{fs}$ | Resonant inductors of main transmitter coils and receiver coil | $15\mu H$ |
| $L_{fa1}, \ldots, L_{fan}$ | Resonant inductors of assisted coils | $1.66\mu H$ |
| $C_{fp1}, \ldots, C_{fpn}$, and $C_{fs}$ | Parallel resonant capacitors of main transmitter coils and receiver coil | $233nF$ |
| $C_{fa1}, \ldots, C_{fan}$ | Parallel resonant capacitors of assisted coils | $2.1\mu F$ |
| $C_{p1}, \ldots, C_{pn}$, and $C_2$ | Series resonant capacitor of main transmitter coils and receiver coil | $100nF$ |
| $C_{a1}, \ldots, C_{an}$ | Series resonant capacitor of assisted coils | $420nF$ |
| $f_s$ | Operating frequency of inverter | $85kHz$ |
| $R_L$ | Load resistor | $25\Omega$ |

FIG. 20

COMPARISON WITH RECENT WORKS

| | This Work | [21] | [22] | [23] | [24] |
|---|---|---|---|---|---|
| Tx & Rx Structure | Tx: Unipolar with Small Auxiliary Coils, Rx: Unipolar | Tx: Unipolar, Rx: Double Unipolar | Tx: DDQP, Rx: DDP | Tx: Bipolar-Non-Salient-Pole (BNSP), Rx: Two-Phase Double-D | Tx: n-type, Rx: DD (4-phase) |
| Cost | Low | High | High | High | High |
| Complexity | Low | Medium | High | High | High |
| Output Fluctuation Rate During EV Motion | Within 8.4% | 23% | Within 10% | 36.7% | Within 7.3% |

FIG. 21

STRUCTURE-BASED METHODS TO MITIGATE VOLTAGE FLUCTUATIONS IN DYNAMIC WIRELESS POWER TRANSFER FOR ELECTRIC VEHICLES

BACKGROUND

Electric vehicles (EVs) are increasingly becoming the preferred choice over traditional fossil fuel counterparts, prompting a strategic shift in the automotive industry towards electric propulsion. This transition is driven by concerns about depleting fossil resources and the environmental impact of conventional fuel vehicles. Despite advancements in the design of electric vehicle charging infrastructure, the persistent challenge of range anxiety remains a significant obstacle, impeding EVs widespread public acceptance.

In this context, dynamic wireless power transfer (DWPT) emerges as a promising technology, offering a solution by ensuring a consistent and uninterrupted charging experience for mobile electric vehicles. This approach effectively alleviates range anxiety and has the potential to reduce the need for larger battery capacities.

Dynamic wireless power transfer is primarily categorized by the length of its transmitter coil, falling into either long-track transmitter or segmented coil array configurations.

The long-track transmitter utilizes an elongated transmitter track, significantly larger than the receiver coils, enabling long-distance charging of multiple vehicles simultaneously. However, this type of DWPT system faces challenges related to low efficiency and high electromagnetic interference.

In contrast, the segmented coil array type effectively overcomes the drawbacks of the long-track type but introduces output voltage fluctuations as the vehicle traverses multiple transmitter coils.

Addressing output voltage fluctuation is crucial in DWPT systems due to their potential adverse effects on battery lifespan and overall system efficiency. Moreover, significant fluctuations in output voltage not only complicate the design of the receiver DC-DC converter but also reduce the overall average output power of the DWPT system. Therefore, enhancing output stability is a crucial aspect of DWPT technology.

Recent research has addressed output fluctuations in DWPT systems through the development of magnetic coil structures to mitigate coupling variations and the implementation of control schemes to stabilize output voltage in these systems.

To mitigate output fluctuations, one strategy involves developing coil structures that improve misalignment tolerance, providing a smooth mutual coupling profile in DWPT systems. Some researchers investigated the optimization of transmitter and receiver dimensions to reduce variations in mutual coupling. Some other researchers deployed a dual receiver to minimize variations in output voltage and power. This design features complementary coupling coefficients between each receiver and the transmitter as the vehicle moves, helping to reduce fluctuations during the transition between adjacent transmitter coils.

Additionally, in certain investigation, a large receiver coil and an optimized arrangement were utilized for segment DWPT, which ensures strong coupling during the transition from one transmitter coil to another. In certain other investigation, the researchers proposed a new transmitter track that incorporates alternately arranged segmented rectangular-solenoid pads. This design employs magnetic field complementation to effectively minimize output fluctuations on the receiver side.

In certain investigation, the researchers proposed a DWPT coupler structure featuring multiple Q coils on the transmitter side to provide smooth mutual coupling profile with low fluctuation rate. This design effectively integrates the characteristics of both crossed and overlapped coil configurations.

Another aspect to consider in mitigating output voltage fluctuations is the adjustment of compensation networks. In another investigation, a series-series-parallel (S\SP) compensation network topology is introduced, offering insensitivity to coupling variations and, consequently, enabling the attainment of near-constant output voltage.

Additionally, a comprehensive design methodology was presented for primary compensation networks in DWPT systems, aiming to achieve a uniform power profile. Furthermore, an LCC compensation network, specifically designed to withstand coupling variations and stabilize output power and voltage, was presented.

Control strategies offer an effective avenue for maintaining a consistent output voltage profile. In recent years, there have been diverse proposals for control strategies aimed at mitigating output fluctuations in DWPT systems. These strategies fall into three distinct categories: primary side control, secondary side control, and dual side control.

While primary side control has the advantage of simplicity, it has limitations in regulating the electric vehicle's battery and necessitates wireless communication between the primary and secondary sides. In addressing these limitations, secondary side control emerges as a preferred option for controlling DWPT systems. A frequency domain composite control strategy incorporating Proportional-Integral (PI) control, was introduced to address output voltage fluctuations, successfully reducing system output voltage fluctuations within the range of [4.4%, 13%]. In certain investigation, an alternative approach involved implementing a feedforward control strategy, effectively mitigating output fluctuations in the DWPT system. This approach notably reduced battery output current ripples to 6.2%, particularly at slower driving speeds.

Moreover, in some investigation, passivity-based PI control was leveraged to enhance performance in coping with rapidly changing coupling coefficients. However, it is important to note that this specific approach still resulted in an output current pulsation of approximately 60%. The coupling coefficient within the DWPT system undergoes rapid and extensive variations, presenting substantial challenges in control system design and ultimately leading to a degradation in system performance. Control methodologies relying on PI control mechanisms exhibit poor performance in achieving precise tracking control when faced with such rapid changes in the coupling coefficient.

Consequently, nonlinear controllers are preferred as control strategies for DWC systems due to their robust response to disturbances. In certain investigation, an approach involving Model Predictive Control (MPC) was deployed for the receiver-side buck converter to suppress output voltage fluctuations in the DWPT systems.

The existing approaches to addressing voltage fluctuations in Dynamic Wireless Power Transfer (DWPT) systems primarily involve deploying large coils between adjacent transmitter coils to compensate for voltage drops during transitions. These approaches have two major drawbacks: 1) they require additional coils to cancel cross-coupling, leading to increased costs and higher energy losses; and 2) deploying larger coils demands more copper, further raising implementation costs.

BRIEF SUMMARY

There continues to be a need in the art for improved designs and techniques for dynamic charging of electric vehicles.

In an embodiment of the subject invention, a method for a dynamic wireless power transfer (DWPT) system to charge an electric vehicle in motion is provided. The method comprises transmitting wireless power from a plurality of main transmitter coils; transmitting wireless power from one assisted coil disposed between each pair of adjacent main transmitter coils of the plurality of main transmitter coils; receiving the wireless power at a receiver coil when the electric vehicle is charged in motion; providing a primary compensation network coupled to the plurality of main transmitter coils and the assisted coils; and compensating for reactive power at a secondary side by a secondary compensation network coupled to the receiver coil; wherein dimensions and positions of the assisted coils and parameters of the compensation network are configured to maintain a constant (or a substantially constant (e.g., constant at least 90% or at least 95% of the time)) mutual inductance profile between the transmitter coils and the receiver coil when the electric vehicle is charged in motion, thereby reducing power pulsation and providing a stable output voltage to a battery of the electric vehicle. The method may further comprise optimizing a ratio between an inductance of a compensation network for the main transmitter coils and an inductance of a compensation network for the assisted coils to minimize fluctuation in output voltage of the DWPT system. The optimal ratio (Lf) can be, for example, 9 or approximately 9. The method may further comprise optimizing dimensions of the assisted coils to minimize voltage fluctuations and reduce cross-coupling between the main transmitter coils and the assisted coils. The optimizing the dimensions comprises defining a length ratio between the inner length and the outer length of the assisted coil and defining a width ratio between the inner width and the outer width of the assisted coil, searching the length ratio in a first predetermined range and searching the width ratio in a second predetermined range, and determining an optimized set of the length ratio and the width ratio that produces least fluctuation in output voltage of the DWPT system. The method may further comprise optimizing a number of turns in the assisted coils to reduce output voltage fluctuations of the DWPT system. The optimal number of turns in the assisted coils can be, for example, 3 or 4.

In another embodiment of the subject invention, a wireless power transfer system for dynamic charging of an electric vehicle is provided. The system comprises a plurality of main transmitter coils; one assisted coil disposed between each pair of adjacent main transmitter coils of the plurality of main transmitter coils; a receiver coil configured to inductively couple with the main transmitter coils and the assisted coils; a plurality of compensation networks respectively coupled to each of the plurality of main transmitter coils and the assisted coils; and wherein dimensions and positions of the assisted coils and parameters of the primary compensation network are configured to provide a constant (or a substantially constant (e.g., constant at least 90% or at least 95% of the time)) mutual inductance profile when the electric vehicle is charged in motion, thereby reducing power pulsation and providing a stable output voltage to a battery of the electric vehicle. Moreover, each compensation network of the plurality of compensation networks is a LCC compensation network. A ratio between an inductance of the LCC compensation network of the main transmitter coils and an inductance of the LCC compensation network of the assisted coils is optimized to minimize fluctuation in output voltage. The optimal ratio ($r_{Lf}$) can be, for example, 9 or approximately 9. The dimensions of the assisted coils are optimized to minimize voltage fluctuations and reduce cross-coupling between the main transmitter coils and the assisted coils. In addition, the assisted coil has a length ratio ($r_x$) and a width ratio ($r_y$), and wherein the optimal length ratio ($r_x$) is approximately 0.6 and the optimal width ratio ($r_y$) is approximately 0.6 to minimize fluctuation in output voltage. A number of turns in the assisted coils is optimized to reduce output voltage fluctuations. Further, the optimal number of turns in the assisted coils can be, for example, 3 or 4 for minimum output voltage fluctuation. The system may further comprise an inverter at an input side configured to generate high frequency for the plurality of main transmitter coils. The plurality of compensation networks are disposed between the inverter and the plurality of main transmitter coils and/or the assisted coils to reduce reactive power and realize the soft-switching.

In a certain embodiment of the subject invention, a method for optimizing a design of a dynamic wireless power transfer (DWPT) system for charging an electric vehicle in motion is provided, wherein the DWPT system includes a plurality of main transmitter coils, one assisted coil disposed between each pair of adjacent main transmitter coils of the plurality of main transmitter coils, a plurality of compensation networks respectively coupled to each of the plurality of main transmitter coils and the assisted coils. The method comprises following steps: (a) defining parameters of the main transmitter coils; (b) defining an outer length and an outer width of the assisted coils and defining an inner length and an inner width of the assisted coils; (c) defining a length ratio between the inner length and the outer length of the assisted coil and defining a width ratio between the inner width and the outer width of the assisted coil; (d) searching the length ratio in a first predetermined range and searching the width ratio in a second predetermined range; (e) during the step (d) of searching, determining an optimized set of the length ratio and the width ratio that produces least fluctuation in output voltage of the DWPT system; (f) determining whether the optimized set of the length ratio and the width ratio produces minimal cross-coupling between the main transmitter coils and the assisted coils; (g) if the condition of step (f) is not satisfied, go back to step (e); (h) if the condition of step (f) is satisfied, performing finding an optimized number of turns in the assisted coils until the least fluctuation in the output voltage of the DWPT system is obtained; (i) defining a ratio between compensation inductor of the main transmitter coils and compensation inductor of the assisted coils; and (j) performing searching for an optimized set of the length ratio and the width ratio that produces least fluctuation in output voltage of the DWPT system. The first predetermined range is between 0.6 and 0.8 and the second predetermined range is between 0.6 and 0.9.

BRIEF DESCRIPTION OF DRAWINGS

FIG. 19 shows a table of the dimensions of a coupler in a DWPT according to an embodiment of the subject invention.

FIG. 20 shows a table of circuit parameters of a DWPT according to an embodiment of the subject invention.

FIG. 21 shows a table comparing a DWPT according to an embodiment of the subject invention (this work) and state-of-the-art works.

DETAILED DESCRIPTION

Embodiments of the subject invention provide methods and systems for dynamic wireless power transfer (DWPT) to charge an electric vehicle in motion.

Wireless power transfer is a practical technology for charging electric vehicles, offering a convenient solution for plug-in charging. This technology primarily falls into two categories: stationary charging and dynamic charging.

With stationary charging, the driver simply parks the car and charging begins automatically. Dynamic charging, on the other hand, allows electric vehicles to be charged while in motion.

Moreover, the structure of the transmitter's coils in the dynamic charging system can be either long track transmitter or segmented coil array. Long track transmitter, however, suffers from two main disadvantages: low efficiency and high EMI, limiting their practical applications. A segmented coil array overcomes these limitations of long track transmitter but introduces a new challenge: power pulsation at the receiver side. These power pulsations are harmful to the battery's lifetime and need be minimized. Efforts to reduce power pulsation focus on three main areas: modifying the coil's structure, refining the controller, and designing compensation network.

According to the embodiments of the subject invention, a novel coil structure is developed to reduce the power pulsation and provide a constant output profile. Each segmented coil is broken down into smaller sub coils, which are placed next to each other in an optimized manner. The amount of copper used in this structure of the subject invention is the same as that used in the conventional segmented coil array. The biggest advantage of this new structure is its ability to generate an almost constant mutual inductance profile as the vehicles move along the transmitter's coils.

Example One

In one embodiment, the coils in segmented coil arrays are broken down into multiple smaller coils and placed in optimized positions to provide a smooth coupling coefficient. The square area of copper used for the structure of the subject invention matches that of the conventional unipolar coils, resulting in similar or lower cost of implementation. The coupling coefficient of the structure of the subject invention is almost constant and gives rise to a smooth power profile which is beneficial for preserving the battery's lifetime.

The main advantage of the structure of this embodiments of the subject invention lies in its capacity to achieve a constant coupling coefficient, leading to a smooth power profile without imposing additional cost and improving the battery's lifetime by generating uniform power, which is a critical factor for dynamic charging.

Figure 1:
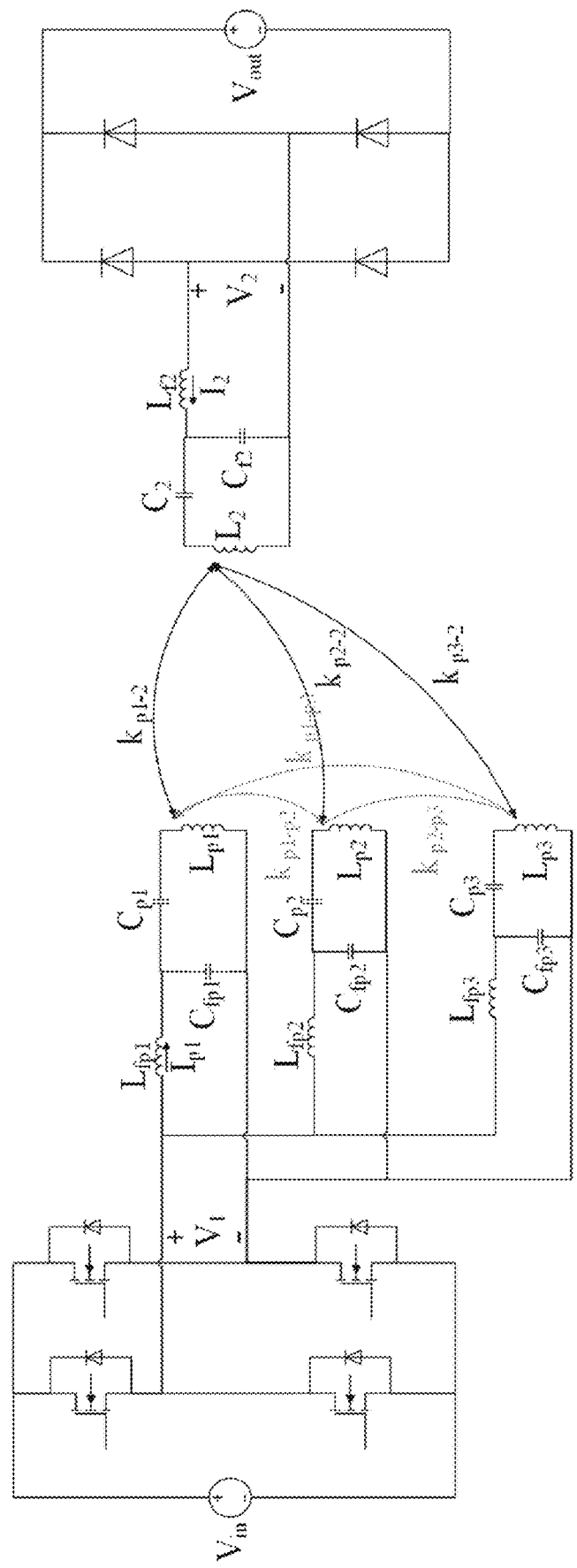
FIG. 1 is a schematic representation showing the circuit topology of the dynamic wireless charging system, according to an embodiment of the subject invention.

Referring to FIG. 1, the circuit topology of the dynamic wireless charging system is provided. An inverter at an input side is configured to generate high frequency for the transmitter coils, and a compensation network is disposed between the inverter and the transmitter coils to reduce reactive power and realize the soft switching. The transmitter coils comprise a plurality of coils and the receiver is installed at the vehicle side. A secondary compensation network at the vehicle side is configured to reduce reactive power and a rectifier is utilized to convert AC to DC to supply the battery.

Figure 2:
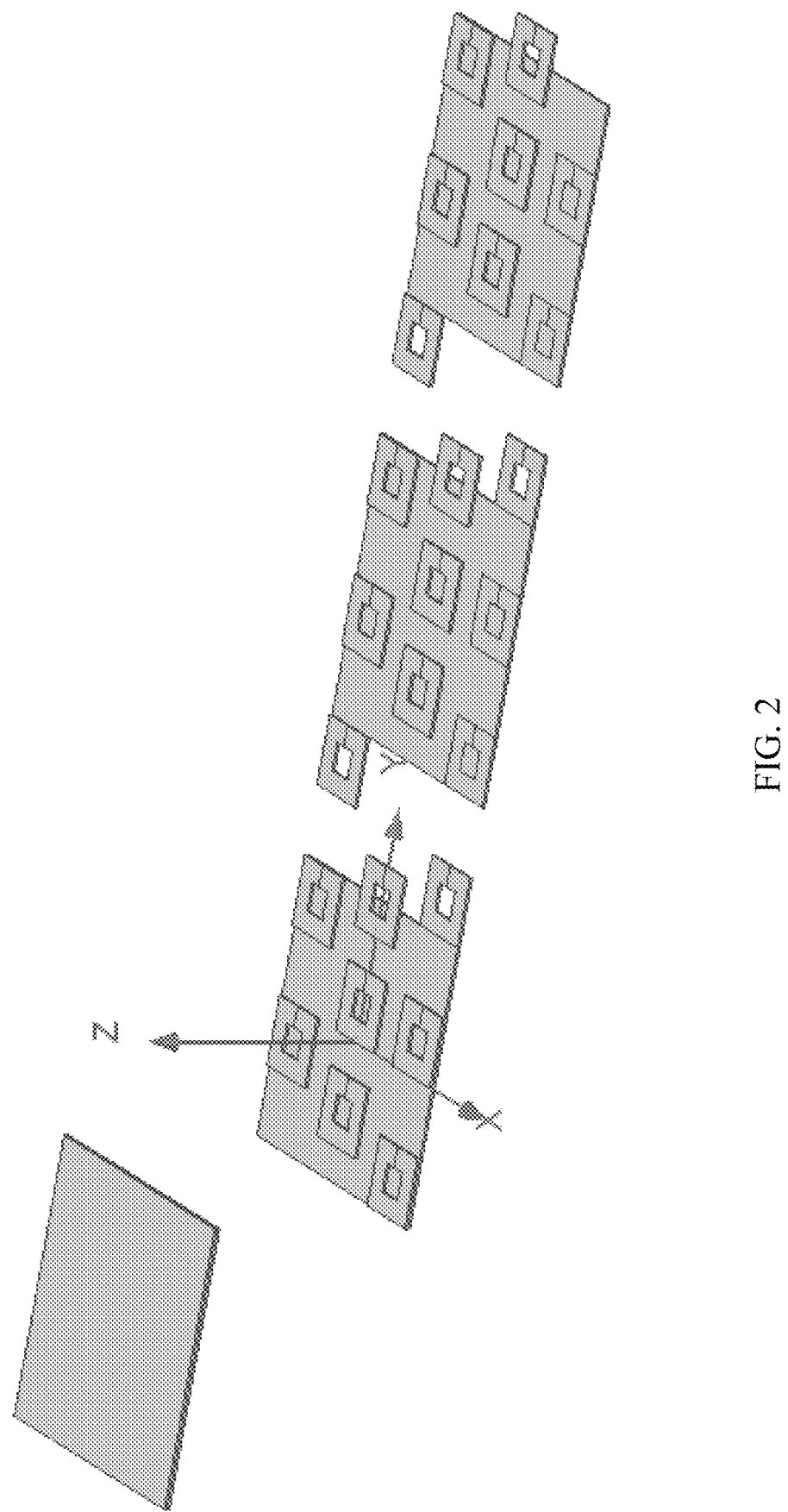
FIG. 2 is a schematic representation showing the structure of the coupler, according to an embodiment of the subject invention.

FIG. 2 shows the structure of the coupler of the subject invention, in which smaller coils are arranged in optimized positions to keep the coupling coefficient smooth with the lowest fluctuation.

Figure 3:
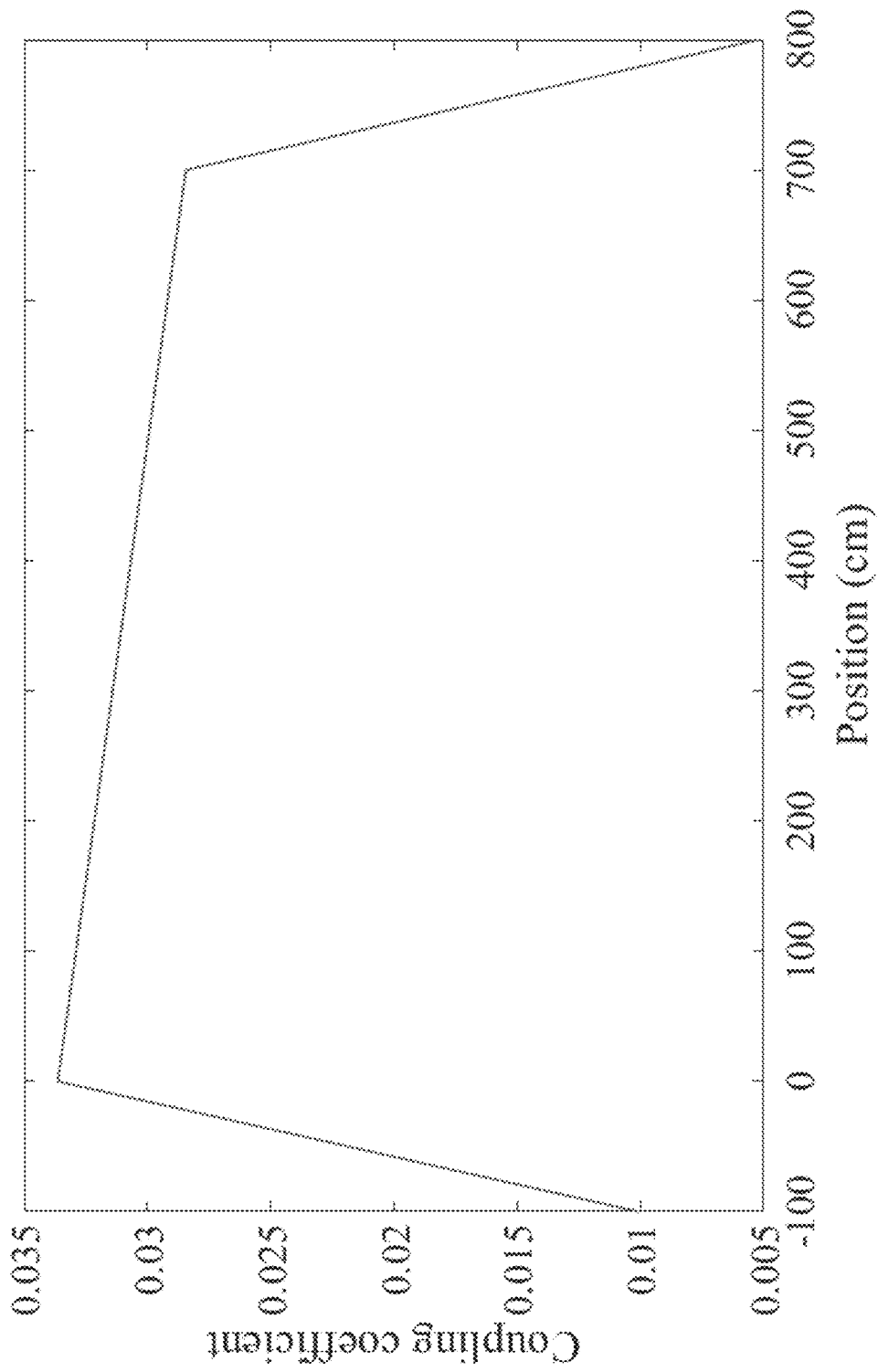
FIG. 3 is a plot diagram demonstrating the coupling coefficient profile of the structure, according to an embodiment of the subject invention.

Referring to FIG. 3, the coupling coefficient profile of the coupler structure of the subject invention demonstrates uniform coupling coefficients.

Example Two

According to another embodiment of the subject invention, a novel system and methods are provided that utilize small auxiliary coils, referred to as "assisted coils" herein, between adjacent transmitter coils, to achieve consistently stable output voltage during transitions between main transmitter coils.

The approach includes three key steps:
1. Defining and optimizing the length and width of the assisted coils to minimize voltage fluctuations while ensuring negligible cross-coupling between the main transmitter coils and assisted coils.
2. Optimizing the number of turns in the assisted coils to reduce output voltage fluctuations.
3. Defining and designing the ratio between the compensation inductor of the main transmitter coils and the assisted coils to compensate for voltage drops during transitions between transmitter coils.

Design Procedure

Figure 4:
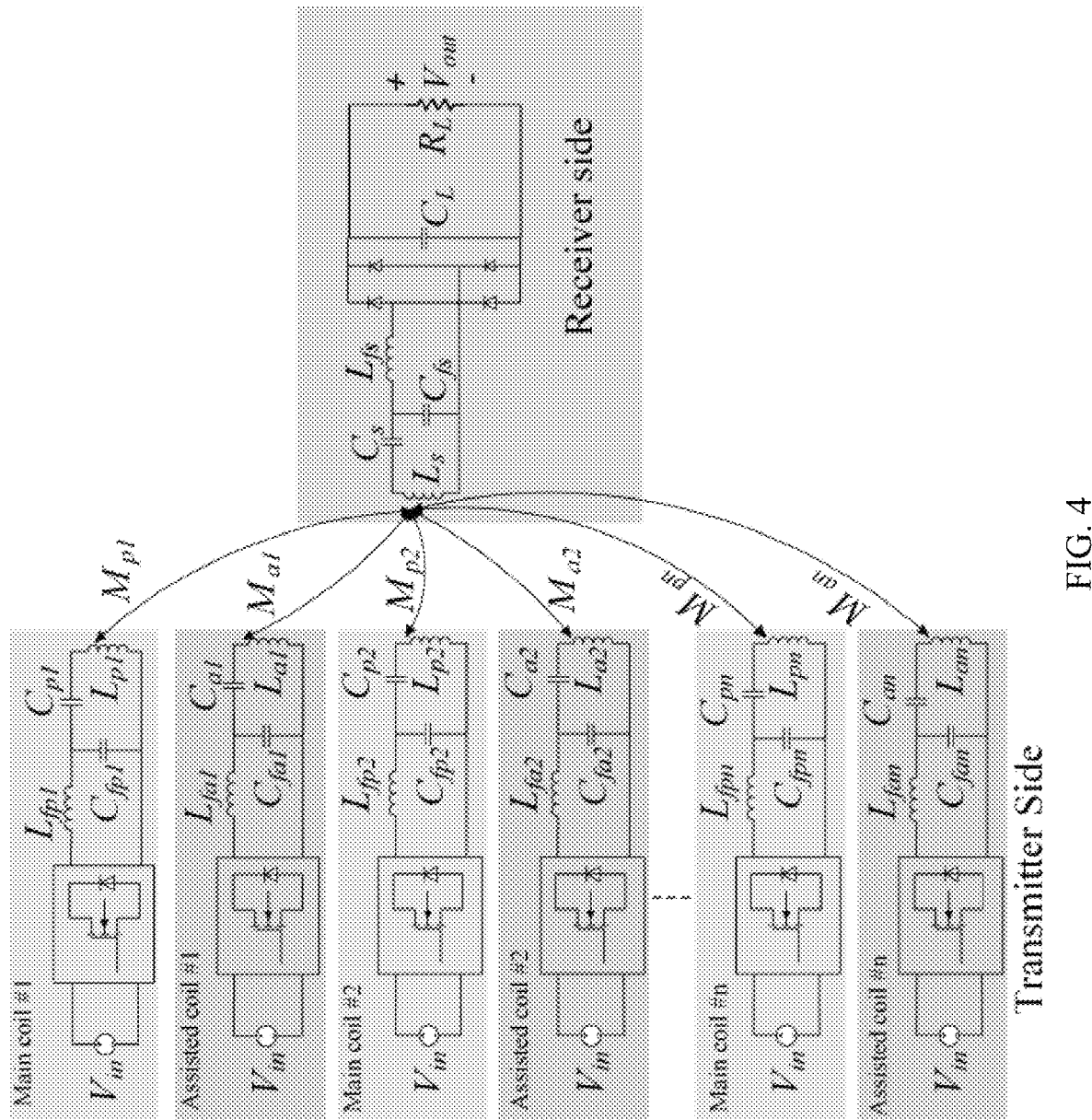
FIG. 4 is a schematic representation showing the circuit topology of the DWPT system, according to an embodiment of the subject invention.

FIG. 4 presents the circuit topology of the DWPT system of the subject invention. As shown in FIG. 4, $M_{pj}$ represents the mutual inductance between the $j^{th}$ main transmitter coil $L_{pj}$ and the receiver coil $L_s$. Furthermore, Maj denotes the mutual inductance between the $j^{th}$ assisted coil $L_{aj}$ and the receiver coil $L_s$. The double-sided LCC compensation network is employed for the DWPT system due to its high efficiency. In this setup, $L_{fp1}$, $L_{fa1}$, $L_{fp2}$, $L_{fa2}$ and Lfs operate as resonant inductors, while $C_{fp1}$, $C_{fa1}$, $C_{fp2}$, $C_{fa2}$, and $C_{fs}$ serve as parallel resonant capacitors. Additionally, $C_{p1}$, $C_{a1}$, $C_{p2}$, $C_{a2}$ and $C_s$ function as series resonant capacitors.

Figure 5:
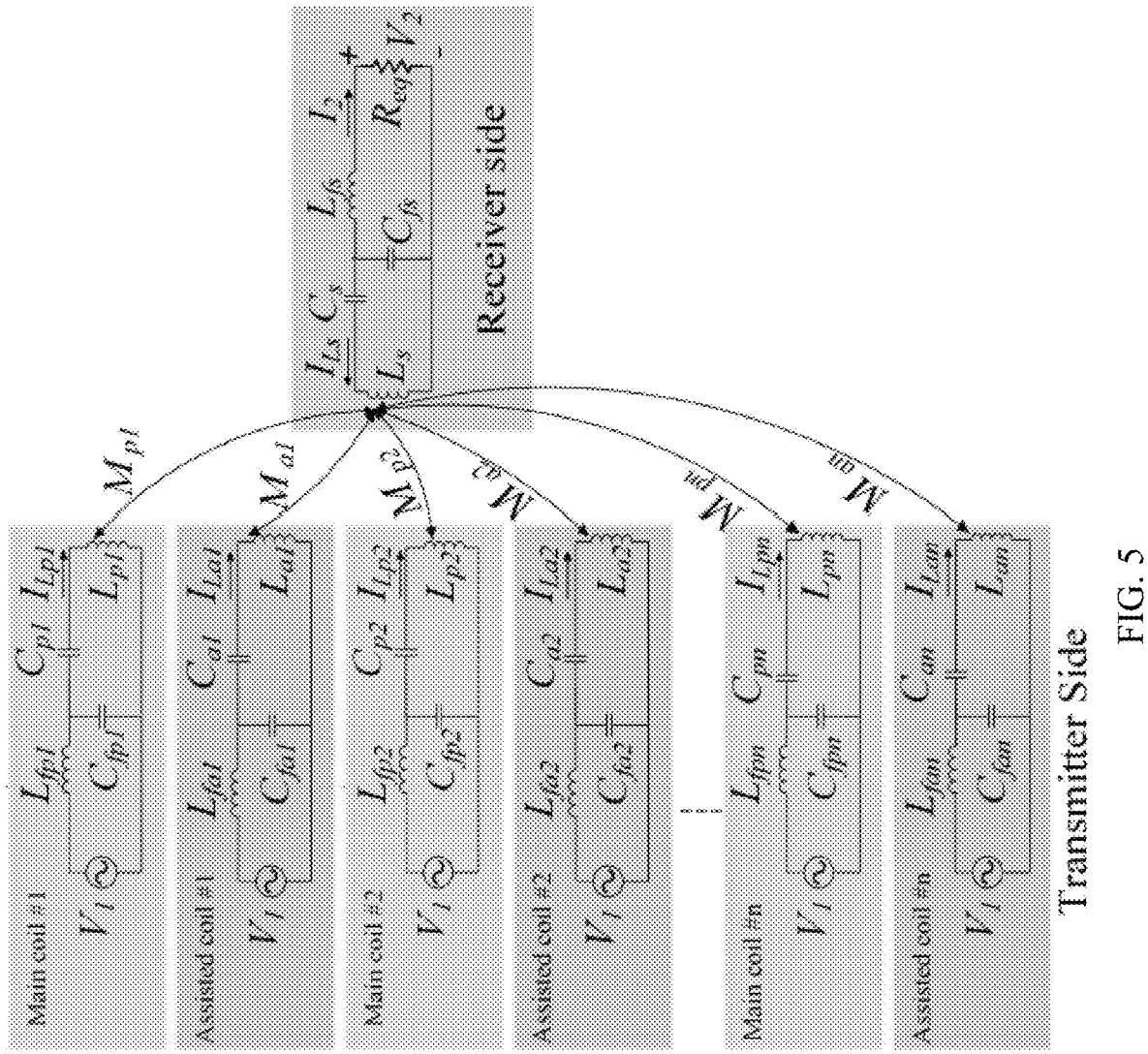
FIG. 5 is a schematic representation showing the fundamental harmonic approximation of the DWPT system, according to an embodiment of the subject invention.

Fundamental harmonic approximation is used to derive the output voltage of the DWPT system of the subject invention, as shown in FIG. 5.

Figure 6:
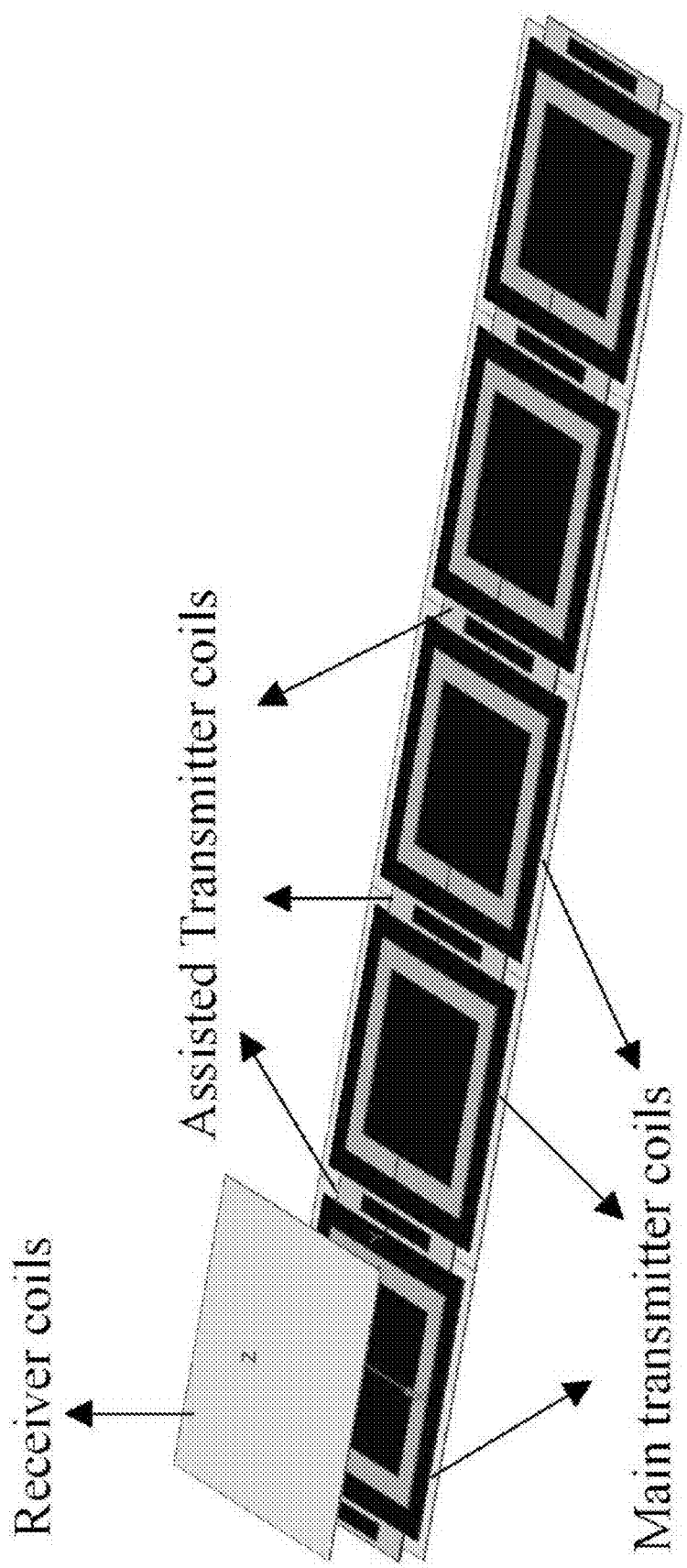
FIG. 6 is a schematic representation showing the 3D view of the coupler structure, according to an embodiment of the subject invention.

FIG. 6 demonstrates a 3D view of the coupler structure.

The currents flowing in the coils on the primary side including main and assisted coils are derived as follows:

$$I_{Lp1} = -j\omega C_{fp1} V_1 \quad (1)$$
$$I_{La1} = -j\omega C_{fa1} V_1$$
$$\vdots$$
$$I_{Lpn} = -j\omega C_{fpn} V_1$$
$$I_{Lan} = -j\omega C_{fan} V_1$$

where $$V_1 = \frac{2\sqrt{2}}{\pi} V_{in}.$$

In the design of the system of the subject invention, the compensation network parameters of the main coils remain the same, and the compensation network parameters of the assisted coils also remain the same. Thus, following equations can be derived:

$$L_{fp1} = L_{fp2} = \ldots = L_{fpn} = L_{fp} \quad (2)$$
$$L_{fa1} = L_{fa2} = \ldots = L_{fan} = L_{fa}$$
$$C_{fp1} = C_{fp2} = \ldots = C_{fpn} = C_{fp}$$
$$C_{fa1} = C_{fa2} = \ldots = C_{fan} = C_{fa}$$
$$C_{p1} = C_{p2} = \ldots = C_{pn} = C_p$$
$$C_{a1} = C_{a2} = \ldots = C_{an} = C_a$$

The output current can be derived as follows:
$$I_2 = w^2 C_{fs} \times (M_{p1} I_{Lp1} + M_{a1} I_{La1} + \ldots + M_{pa} I_{Lpa} + M_{na} I_{Lan}) \quad (3)$$

By substituting Equation (1) into Equation (3), $I_2$ can be derived as follows:

$$I_2 = \quad (4)$$
$$-j\omega^3 C_{fa} V_1 [C_{fs}(M_{p1} + M_{p2} + \ldots + M_{pn}) + C_{fa}(M_{a1} + M_{a2} + \ldots + M_{an})]$$

Since $$V_2 = R_{eq} I_2, \text{ and } C_{fp} = \frac{1}{w^2 L_{fp}}, C_{fa} = \frac{1}{w^2 L_{fa}}, \text{ and } C_{fs} = \frac{1}{w^2 L_{fs}},$$

the following expression can be derived for $V_2$:

$$|V_2| = \frac{R_{eq} V_1}{\omega L_{fs}} \left( \frac{M_{p1} + M_{p2} + \ldots + M_{pn}}{L_{fp}} + \frac{M_{a1} + M_{a2} + \ldots + M_{an}}{L_{fa}} \right) \quad (5)$$

As $$V_{out} = \frac{\pi}{2\sqrt{2}} V_2 \text{ and } R_{eq} = \frac{8}{\pi^2} R_L, \quad (6)$$

Equation (5) can be rewritten as follows:

$$|V_{out}| = \frac{2\sqrt{(2)} R_L V_1}{\pi \omega L_{fs}} \left( \frac{M_{p1} + M_{p2} + \ldots + M_{pn}}{L_{fp}} + \frac{M_{a1} + M_{a2} + \ldots + M_{an}}{L_{fa}} \right)$$

As indicated in Equation (6), by optimizing the assisted coils (that is, tuning $M_{a1} \ldots M_{an}$) and selecting the optimal compensation inductor for the assisted coils ($L_{fa}$), a more stable output voltage with minimal fluctuation can be achieved.

Figure 7:
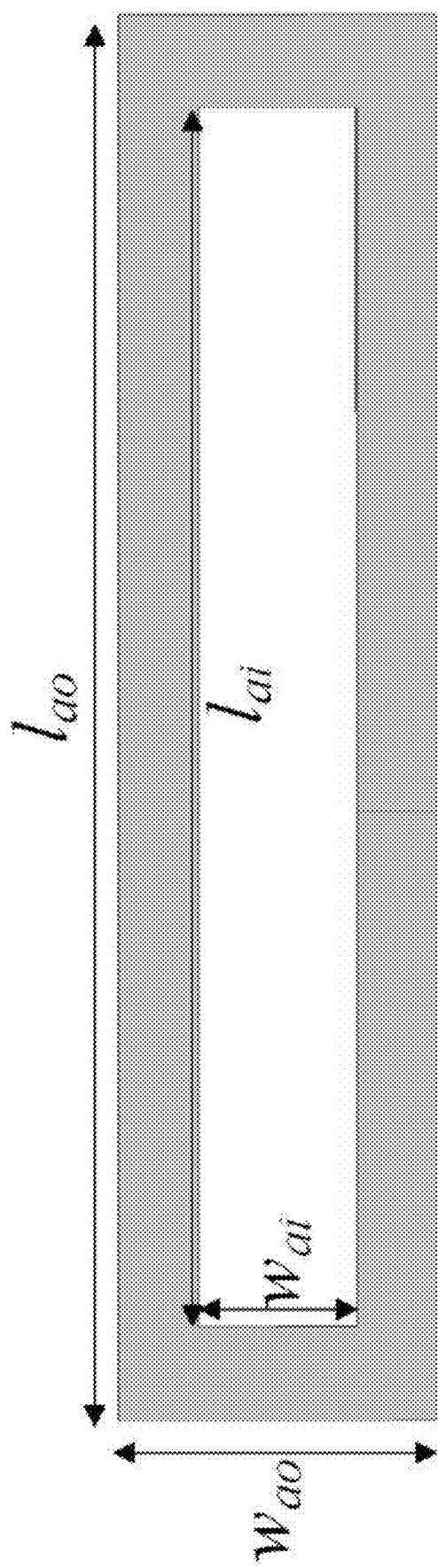
FIG. 7 is a schematic representation showing the structure and parameters of the assisted coil, according to an embodiment of the subject invention.

To find the optimal $L_{fa}$, a ratio between $L_{fp}$ and $L_{fa}$ is defined as $r_{Lf}$, which can be optimized to minimize voltage variation. First, the optimization of the assisted coils is employed to determine the optimal dimensions for achieving a stable output voltage. FIG. 6 shows the structure of the coupler for the DWPT system. In this structure, assisted coils are placed between adjacent main transmitter coils, each of which has its own LCC compensation network. In addition, FIG. 7 is a schematic representation showing the structure and parameters of the assisted coil.

The design process of the assisted coils begins with defining the length ratio ($r_x$) and width ratio ($r_y$), which are expressed as follows:

$$r_x = \frac{l_{ai}}{l_{av}}, r_y = \frac{w_{ai}}{w_{ao}} \quad (7)$$

Figure 8:
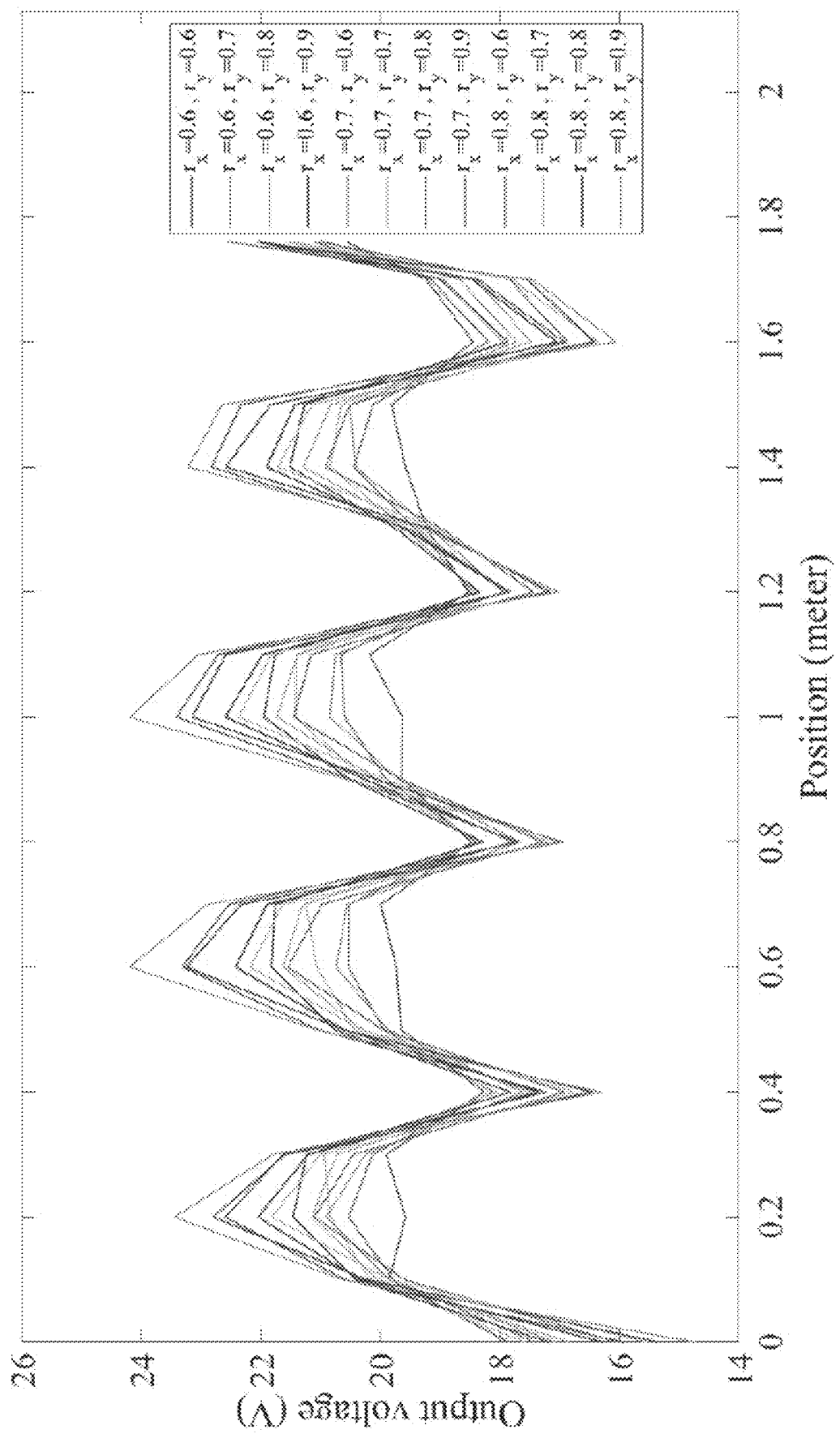
FIG. 8 is a plot diagram showing the output voltage for different $r_x$ and $r_y$ values with 3 turns in the assisted coils ($n_a=3$) and $r_{Lf}=9$, according to an embodiment of the subject invention.

The objective is to sweep $r_x$ from 0.6 to 0.8 and $r_y$ from 0.6 to 0.9 to determine the optimal values that minimize fluctuation in the output voltage. For this analysis, $r_{Lf}$ is set to 9. FIG. 8 shows results of the fundamental harmonic approximation of the output voltage for various values of $r_x$ and $r_y$, with 3 turns in the assisted coils ($n_a=3$) and $r_{Lf}=9$. It is evident that $r_x=0.6$ and $r_y=0.6$ yield the least fluctuation in output voltage when $n_a=3$. The fluctuation rate of the output voltage in this configuration is +5.92%.

Figure 9:
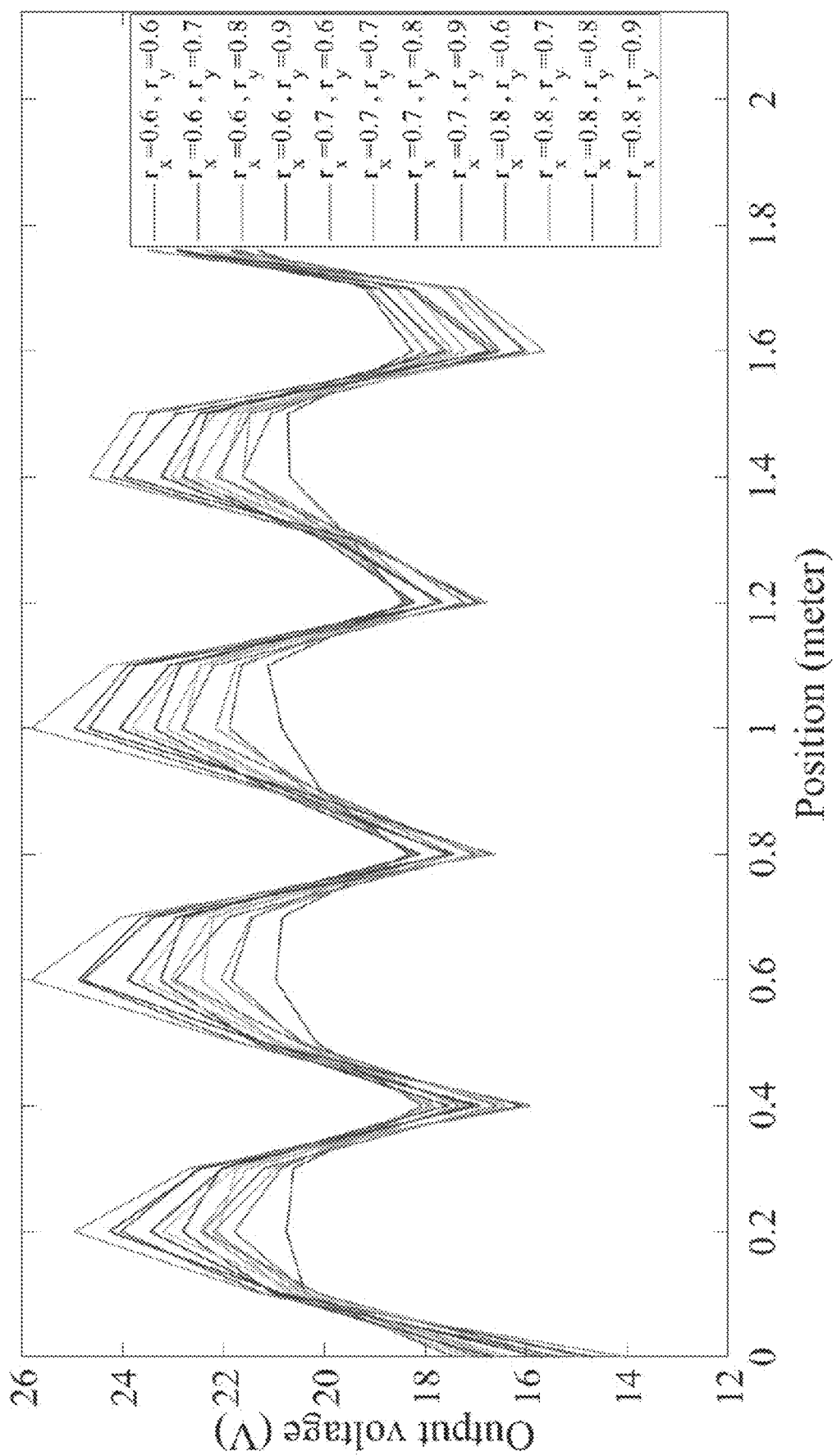
FIG. 9 is a plot diagram showing the output voltage for different $r_x$ and $r_y$ values with 4 turns in the assisted coils ($n_a=4$) and $r_{Lf}=9$, according to an embodiment of the subject invention.

FIG. 9 presents results of the fundamental harmonic approximation of the output voltage for various values of $r_x$ and $r_y$, with 4 turns in the assisted coils ($n_a=4$) and $r_{Lf}=9$. It is evident that $r_x=0.6$ and $r_y=0.6$ result in the lowest fluctuation in output voltage when $n_a=4$. The output voltage fluctuation rate in this configuration is +6.75%.

Figure 10A:
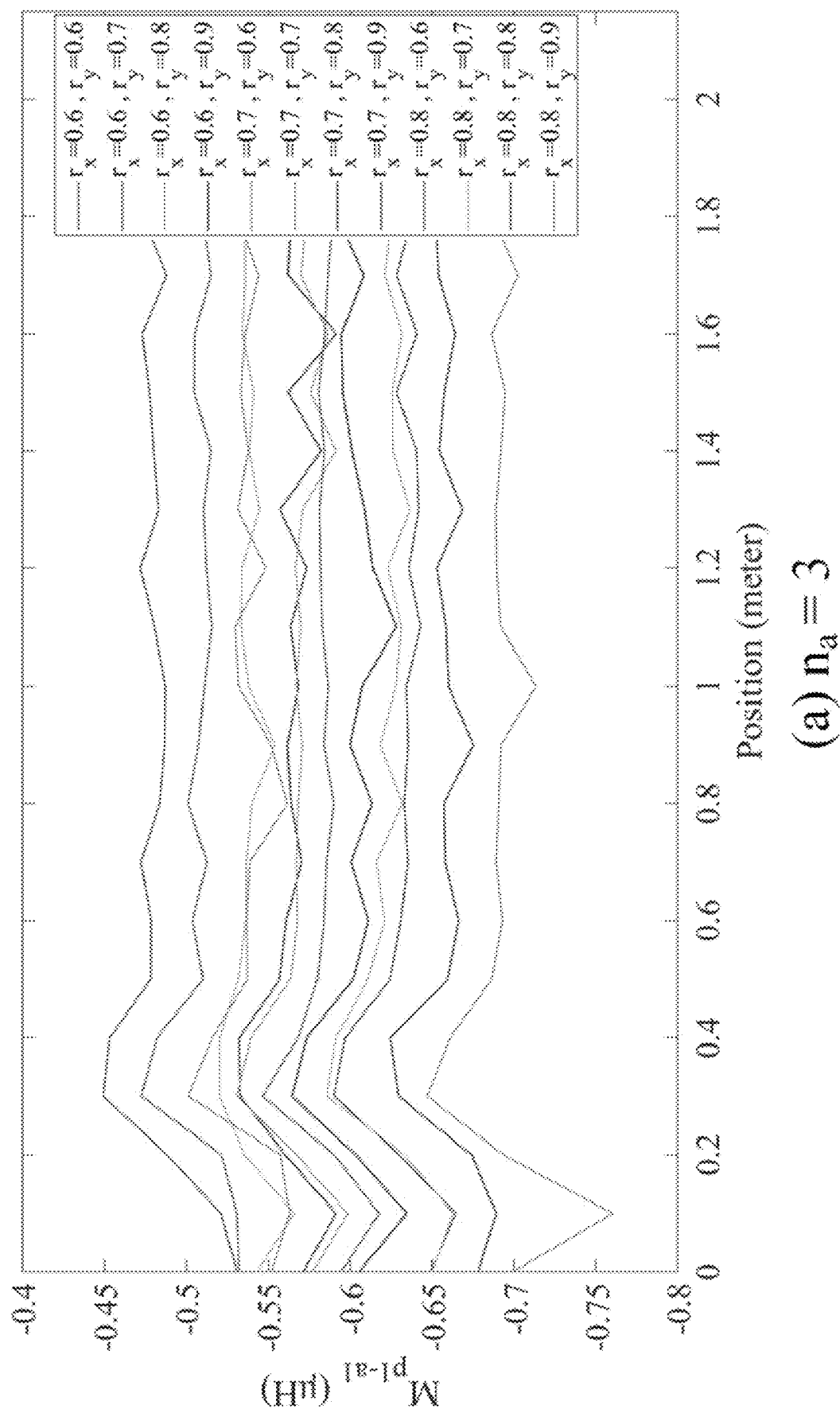
FIGS. 10(a)-10(b) are plot diagrams showing the mutual inductance between the transmitter's main coil ($L_{p1}$) and the assisted coil ($L_{a1}$), denoted as $M_{p1,a1}$, for various values of $r_x$, $r_y$, and different numbers of turns, according to an embodiment of the subject invention.
Figure 10B:
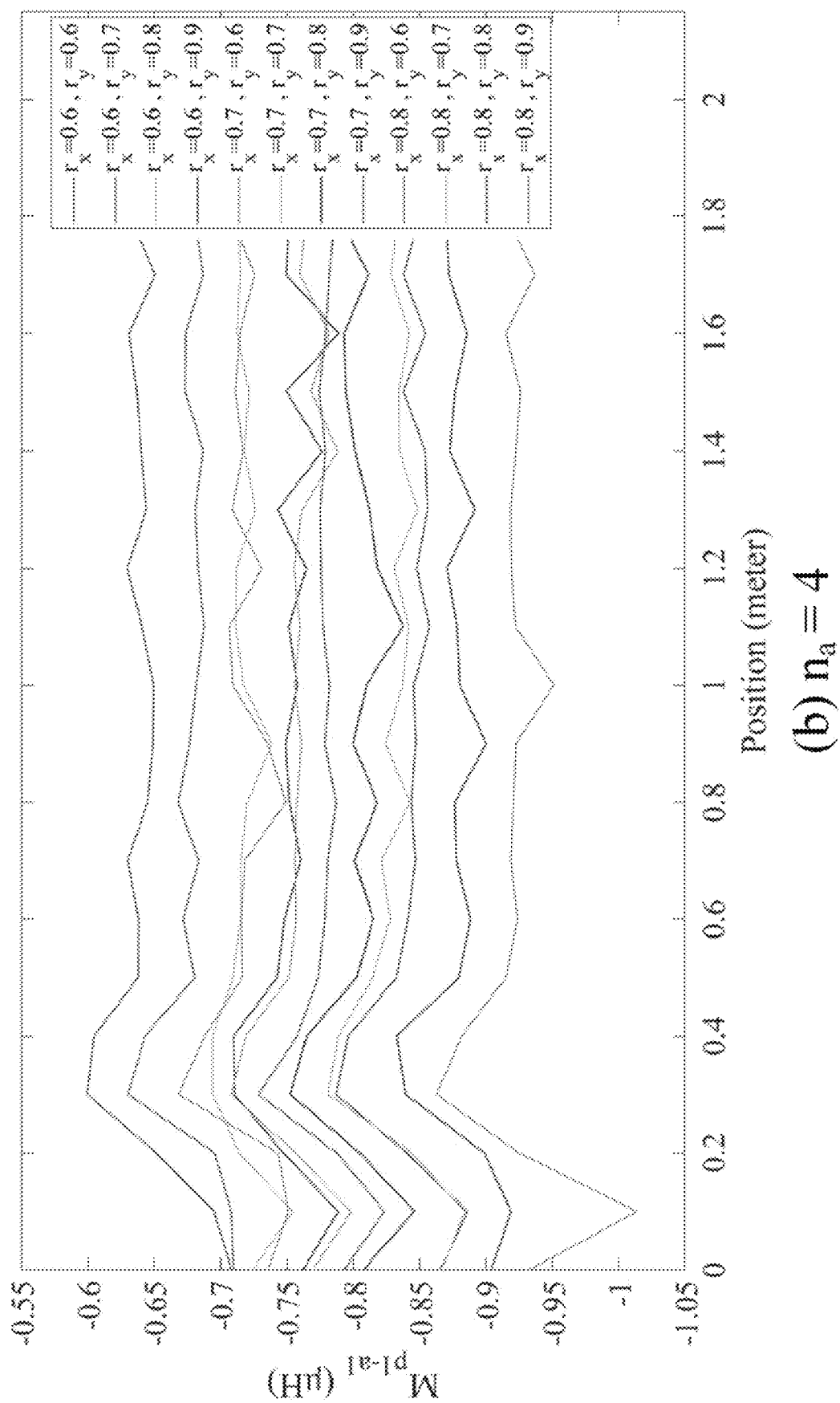

The mutual coupling between the main coils and assisted coils is also analyzed. FIG. 10 shows the mutual inductance between the transmitter's main coil ($L_{p1}$) and the assisted coil ($L_{a1}$), denoted as $M_{p1,a1}$, for various values of $r_x$, $r_y$, and different numbers of turns. As shown in FIGS. 10(a)-10(b), the mutual inductance $M_{p1a1}$ is approximately −480 nH for $r_x=0.6$, $r_y=0.6$, and $n_a=3$, and about −630 nH for $r_x=0.6$, $r_y=0.6$, and $n_a=4$, which are nearly the same.

The design of the compensation inductor for the assisted coil begins with defining the following ratio:

$$r_{Lf} = \frac{L_{fp}}{L_{fa}} \quad (8)$$

Moreover, Equation (6) can be rewritten as follows:

$$|V_{out}| = \frac{2\sqrt{2} R_L V_1}{\pi \omega L_{fa} L_{fp}} [M_{p1} + M_{p2} + \ldots + M_{pn} + r_{lf}(M_{a1} + M_{a2} + \ldots + M_{an})] \quad (9)$$

It is noted that the output voltage fluctuation rate is calculated using the following formula:

$$\Delta V_{out} \% = \frac{V_{out,max} - V_{out,min}}{V_{out,avg}} * 100\% \quad (10)$$

To find the optimal value of $r_{Lf}$, this parameter is swept from 9 to 11 to demonstrate the impact of each value on the output voltage profile. The value that results in the least fluctuation in output voltage is considered the optimal one.

Figure 11A:
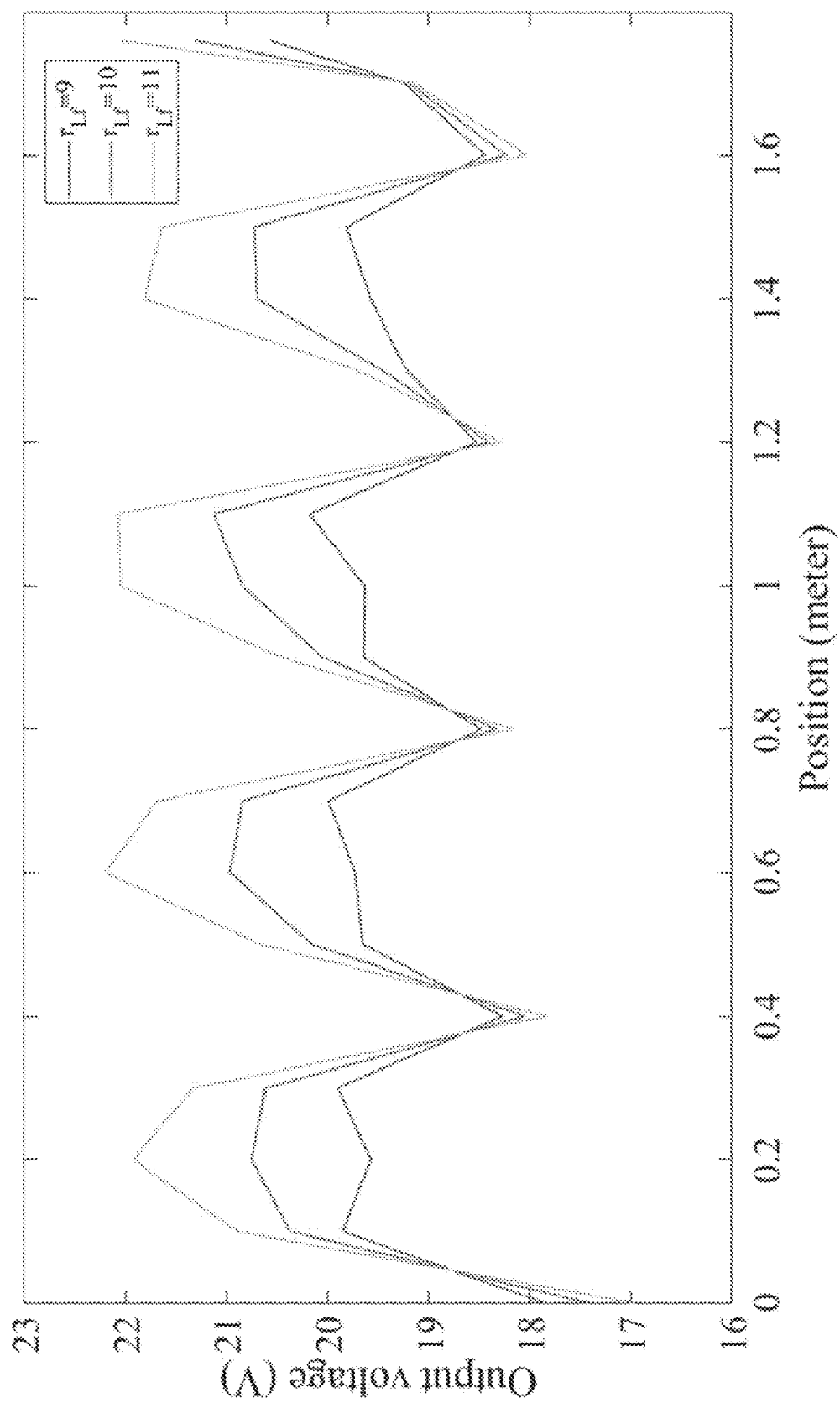
FIGS. 11(a)-11(b) are plot diagrams showing the output voltage when $r_x=0.6$ and $r_y=0.6$ with different rf, according to an embodiment of the subject invention.
Figure 11B:
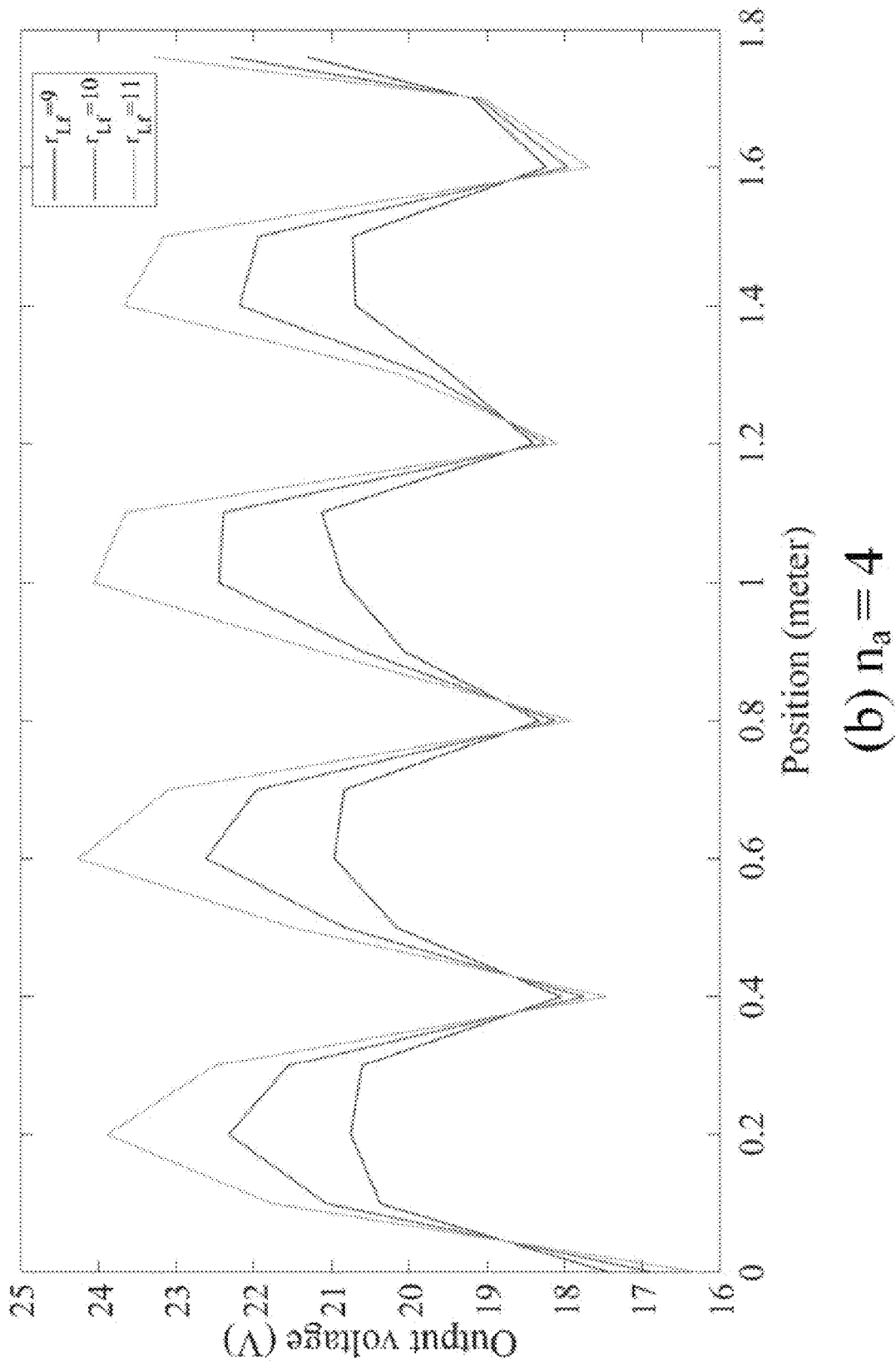

As shown in FIG. 11, when the number of turns of the assisted coil ($n_a$) is 3, with $r_x=0.6$ and $r_y=0.6$, the optimal $r_{Lf}$ that provides a stable output voltage with the least fluctuation rate is $r_{Lf}=9$. In this case, the fluctuation rate is ±5.92%. However, when the number of turns of the assisted coil is 4, the optimal value for $r_{Lf}$ is 9, providing a stable output voltage with a fluctuation rate of ±6.5%.

Based on the analysis, it is concluded that for $r_x=0.6$ and $r_y=0.6$, the lowest fluctuation rate in the output voltage can be achieved for $n_a=3$ and $n_a=4$ with $r_Lf=9$.

Figure 12:
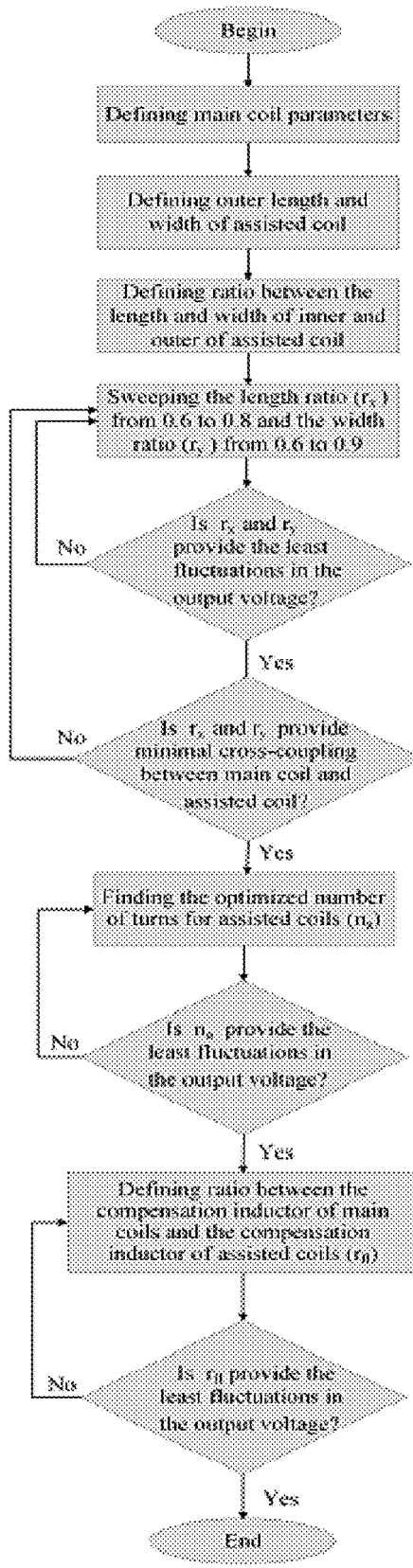
FIG. 12 shows the flowchart of the design process for the assisted coils and their compensation inductor to achieve stable voltage, according to an embodiment of the subject invention.

FIG. 12 shows the flowchart of the design process for the assisted coils and their compensation inductor to achieve a smooth voltage with low variations.

The table in FIG. 19 presents the dimensions of the coupler in the DWPT system of the subject invention. The table in FIG. 20 outlines the circuit parameters of the DWPT system of the subject invention.

Figure 13:
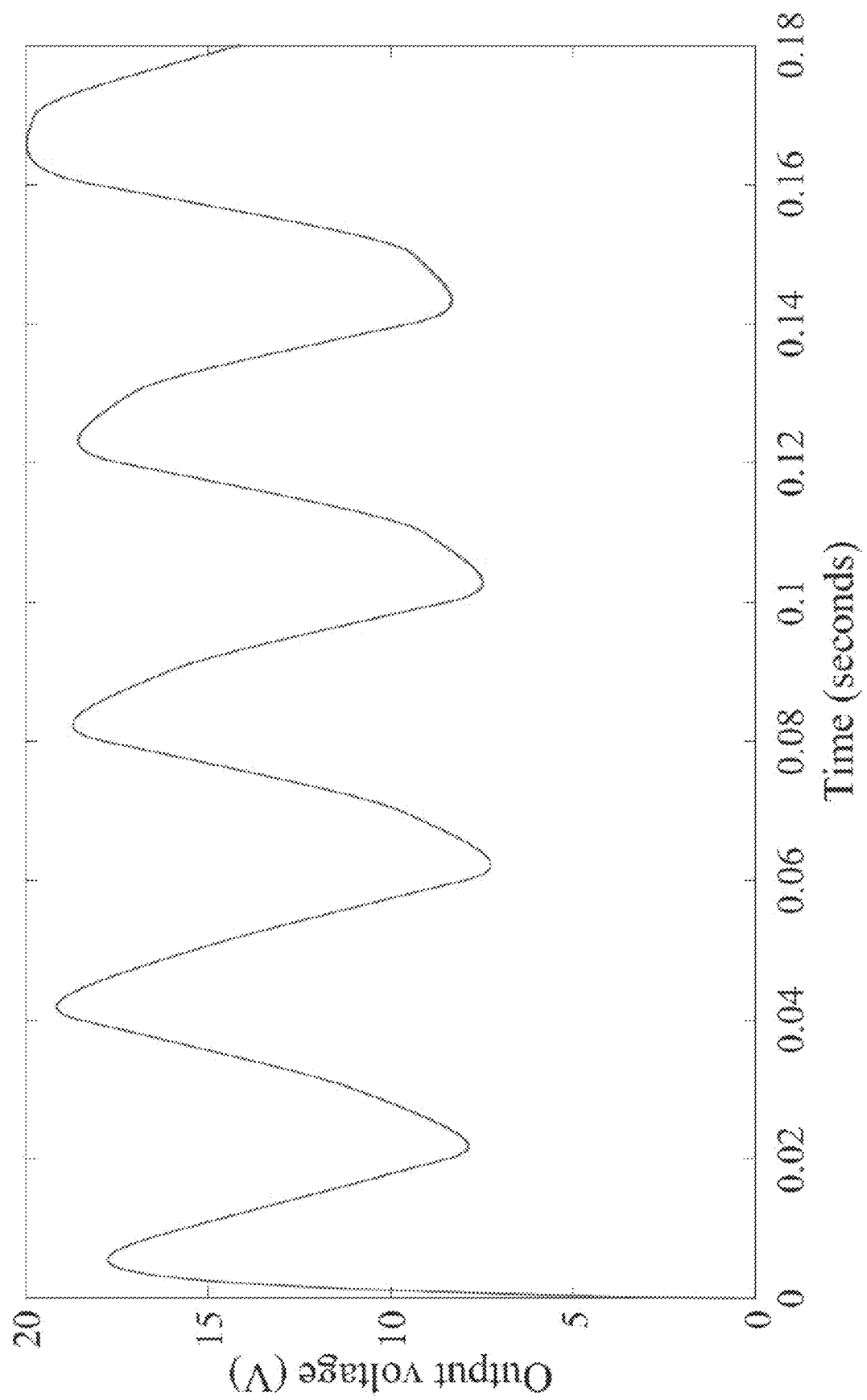
FIG. 13 is a plot diagram showing the output voltage of the conventional DWPT system without the deployment of the assisted coils.
Figure 14:
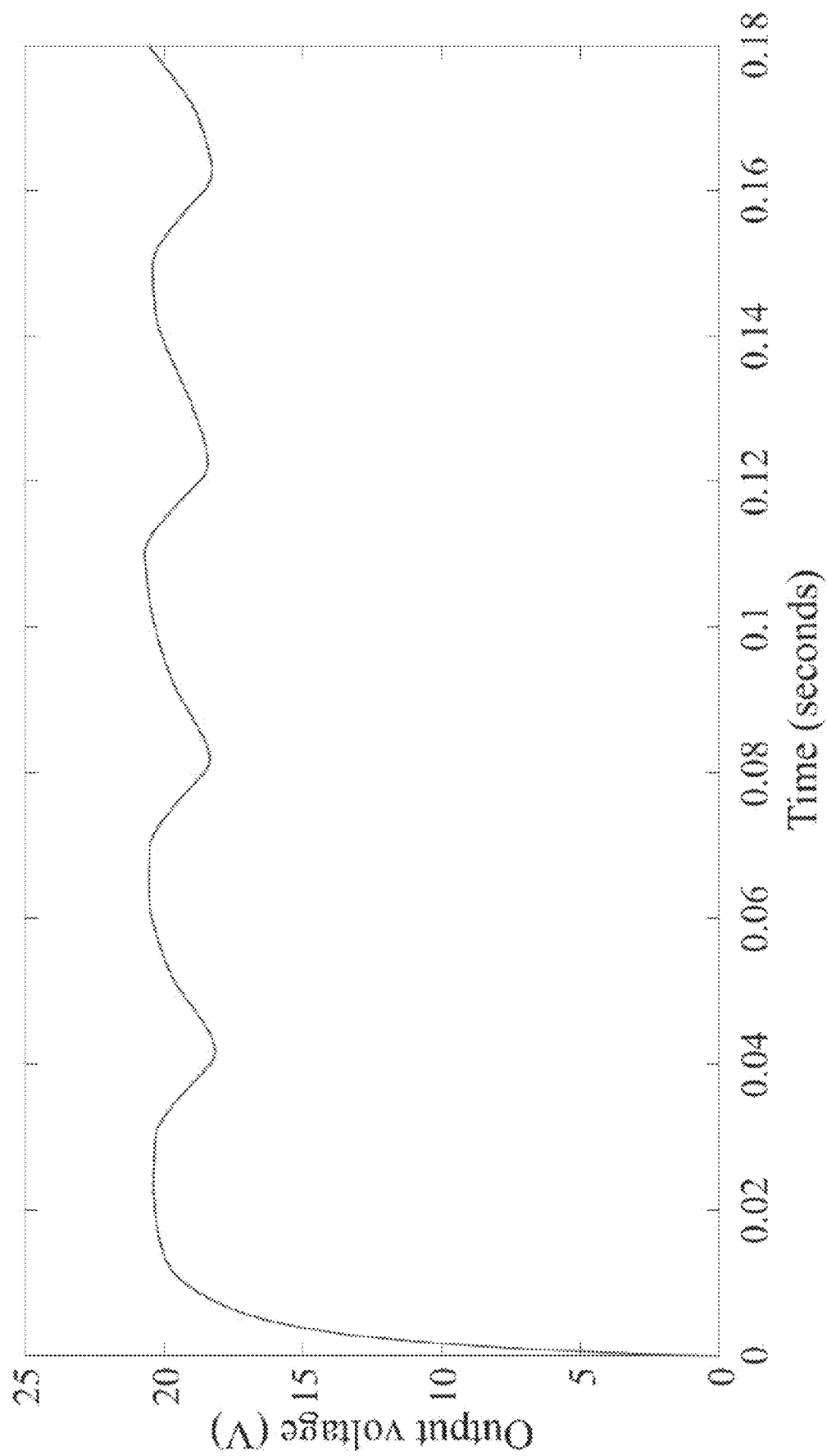
FIG. 14 is a plot diagram showing the output voltage of the DWPT system with the assisted coil, according to an embodiment of the subject invention.

Further, FIG. 13 shows the output voltage of the DWPT system when only the main coils are used without the assisted coil. In this case, the output voltage exhibits significant variation (for example, 62.5%) during the receiver motions. FIG. 14 shows the output voltage when the assisted coils of the subject invention with $r_x=0.6$, $r_y=0.6$, and $r_{Lf}=0.9$ with $n_a=4$ are deployed. As indicated in FIG. 14, the output voltage is stable, with a fluctuation rate of ±6.5%, which is consistent with the analysis mentioned above.

Experimental Results

Figure 15:
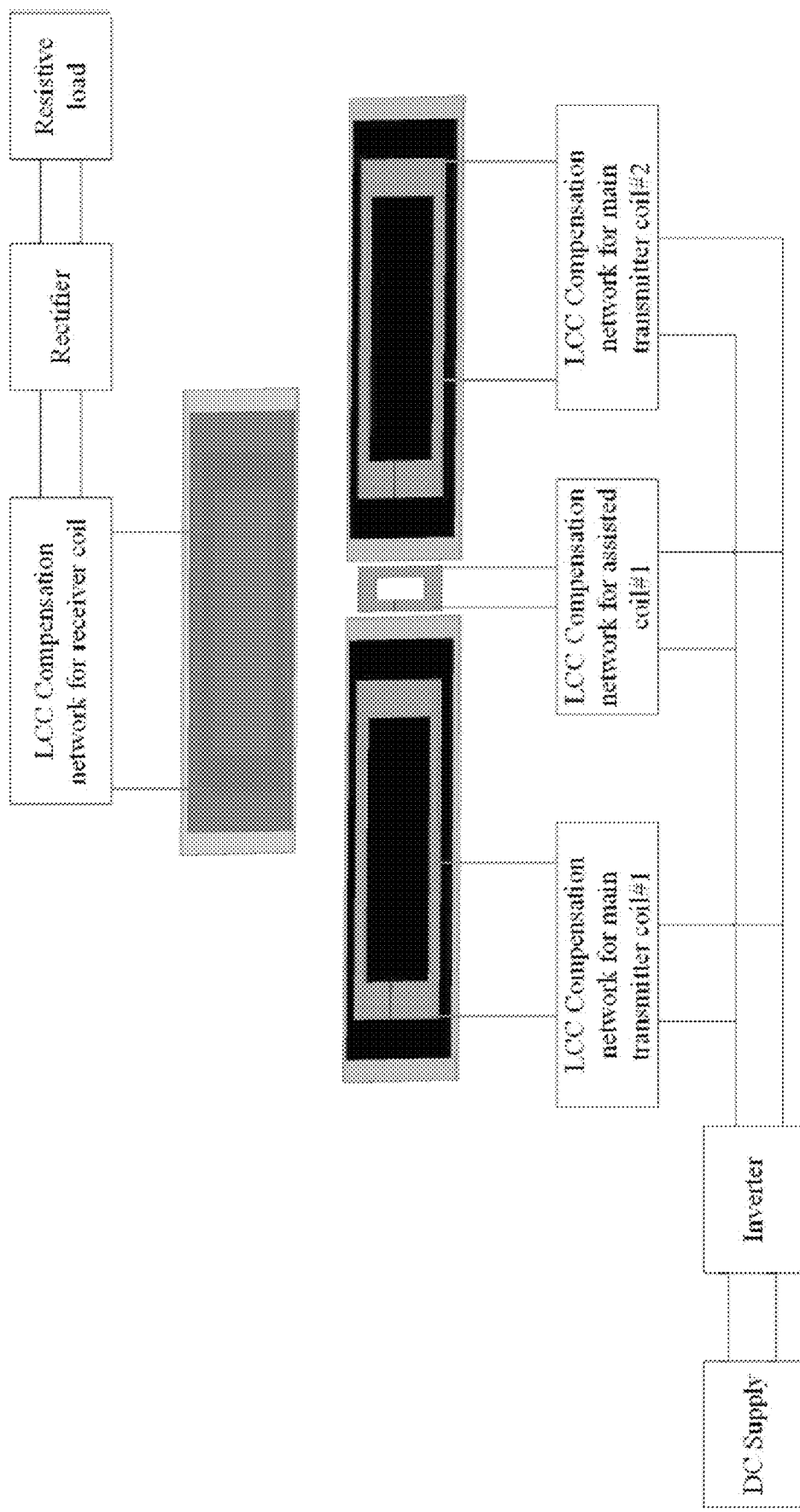
FIG. 15 shows a hardware block diagram of the DWPT system, according to an embodiment of the subject invention.

To validate the effectiveness of the DWPT system of the subject invention, a prototype based on the design process was implemented. FIG. 15 illustrates the block diagram for hardware setup including the optimized assisted coils. A single inverter powers both the main transmitter coils and the assisted coil. In this setup, two main transmitter coils are positioned with the optimized assisted coil placed between them to demonstrate the concept of providing a stable output voltage during the transition from one main transmitter coil to the next. The inverter utilizes silicon carbide MOSFETs (C3M0065090D) to minimize conduction losses. An LCC compensation network is employed for each of the main transmitter coils and for the assisted coil on the primary side, with the same compensation network used on the secondary side.

Figure 16A:
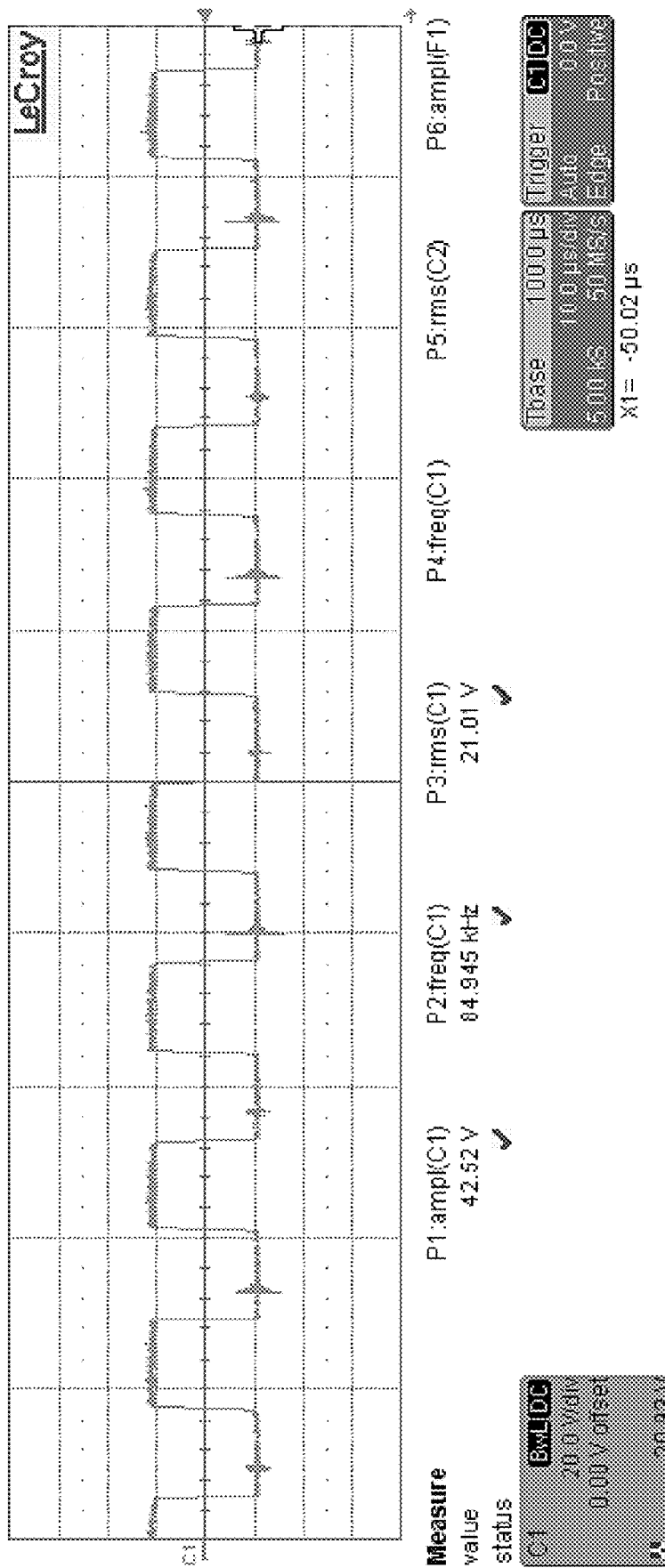
FIG. 16(a)-16(c) show the output voltages of the DWPT system with assisted coils at different positions, according to an embodiment of the subject invention.
Figure 16B:
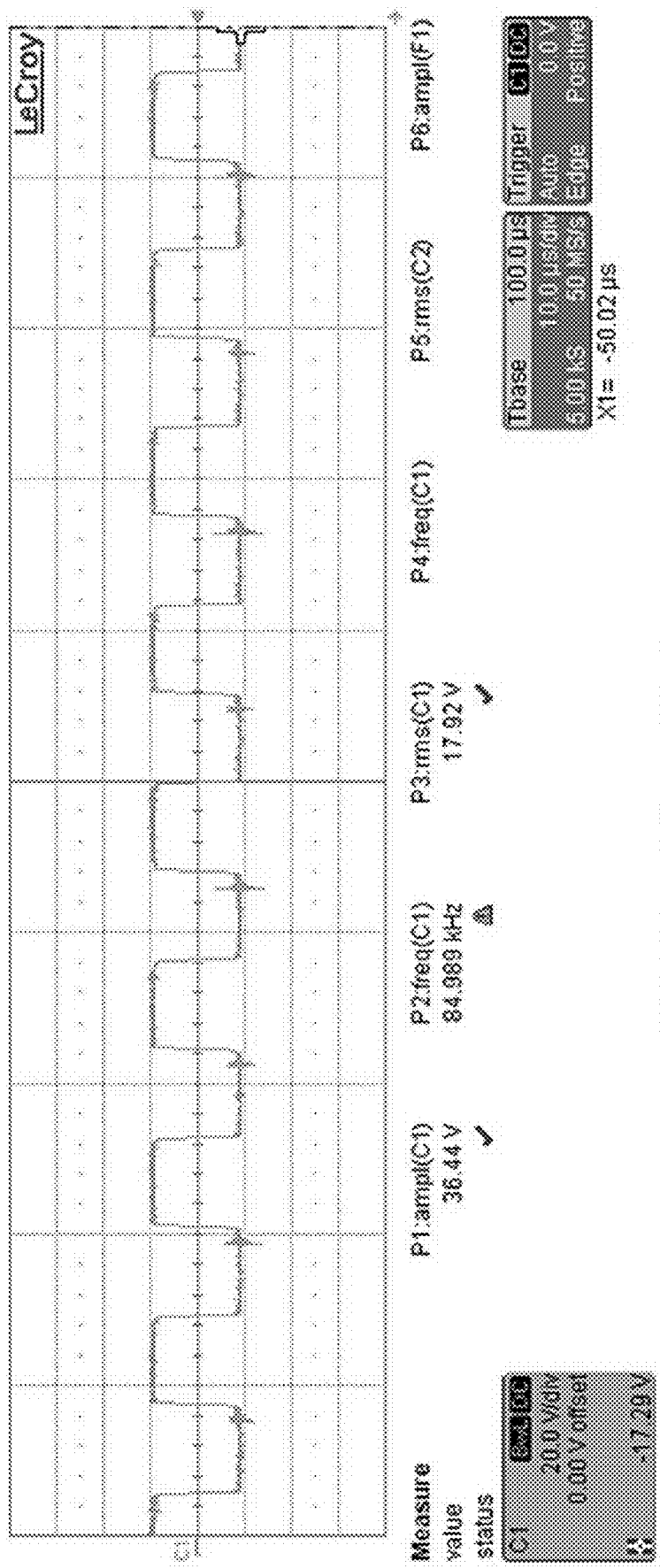
Figure 16C:
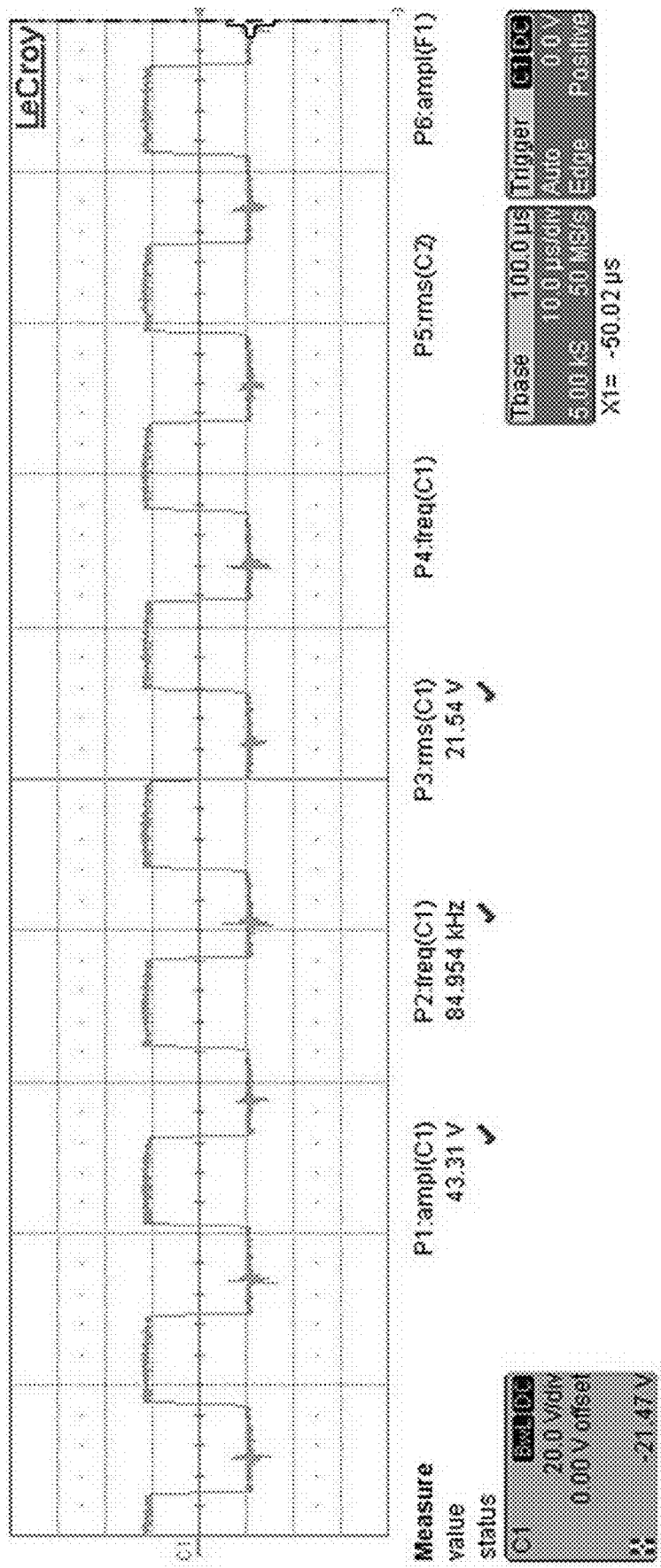

Moreover, FIGS. 16(a)-16(c) show the output voltages of the DWPT system with the deployment of the assisted coils of the subject invention. As illustrated in FIGS. 16(a)-16(c), the output voltages remain stable during the transition between the main transmitter coils, with a maximum drop of 8.4% at the midpoint between the two main transmitter coils.

Figure 17:
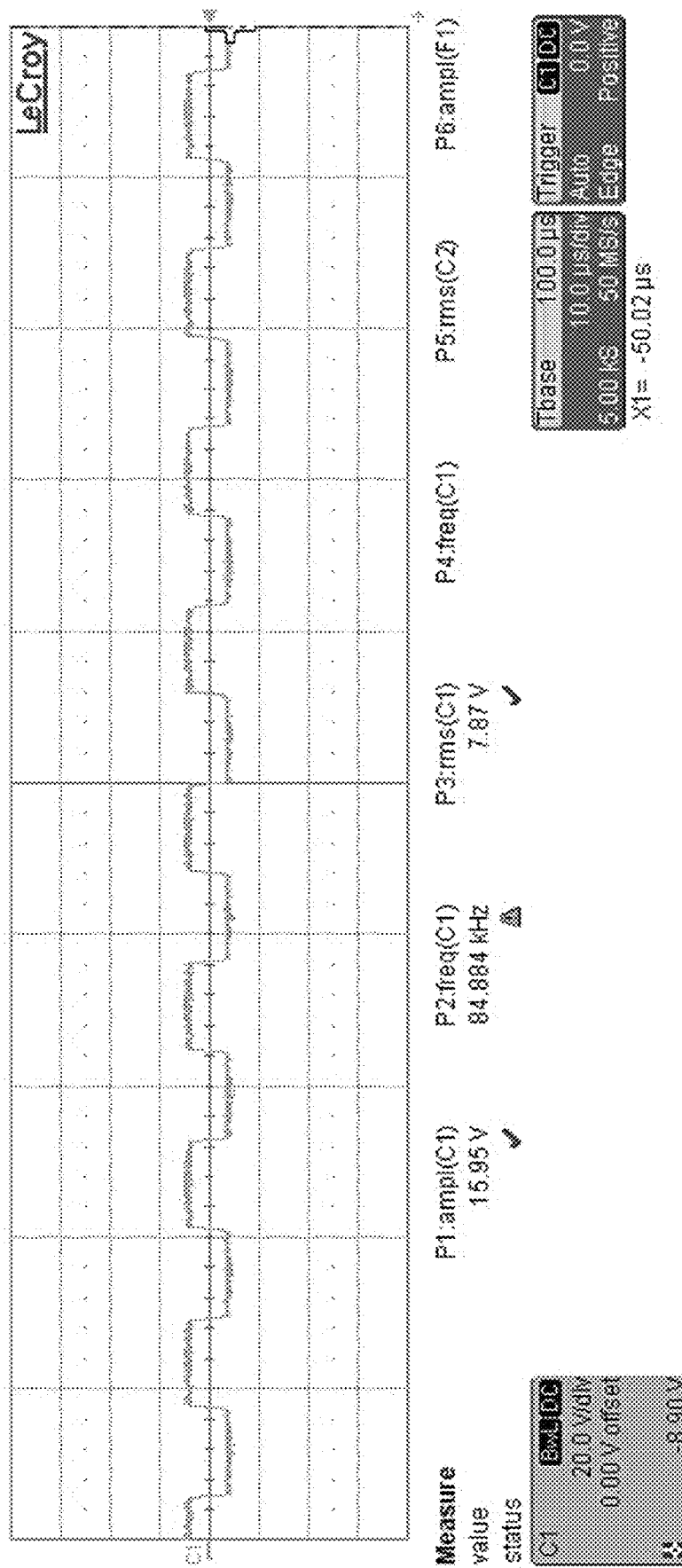
FIG. 17 shows the output voltages of the DWPT system without assisted coil at midpoint between two main transmitter coils.

Further, FIG. 17 shows the output voltages at the midpoint between the two main transmitter coils (at the 200 mm position) without utilizing the assisted coils of the subject invention. It is evident that the output voltage experiences a 63.46% drop at this midpoint. These results demonstrate a 55.06% improvement in output voltage during the transition between adjacent main transmitter coils when utilizing the approach of the subject invention. The method and systems of the subject invention are simple, cost-effective, and efficient in providing stable output voltages.

Figure 18A:
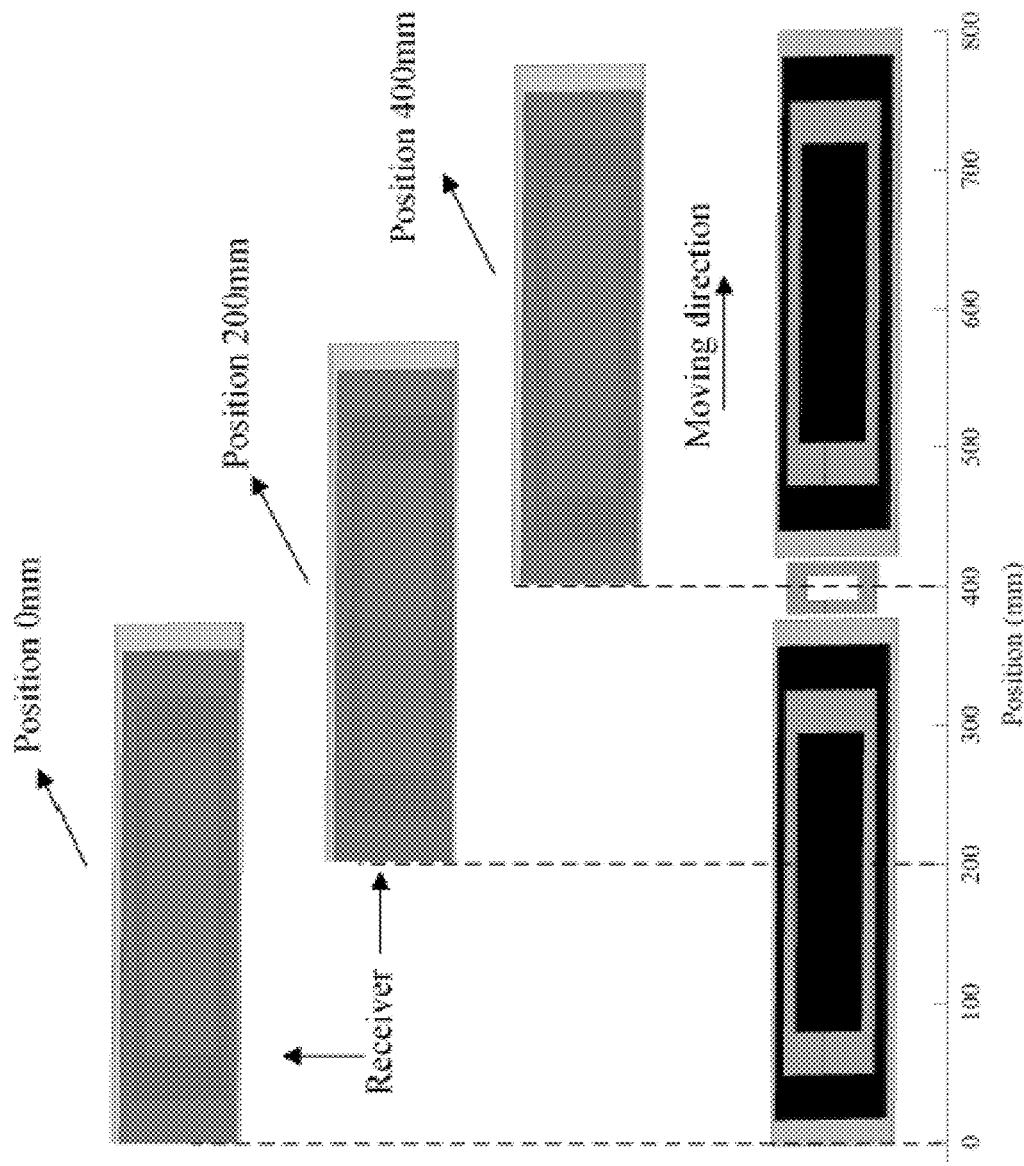
FIG. 18(a) is a schematic representation showing the physical visualization of various positions.
Figure 18B:
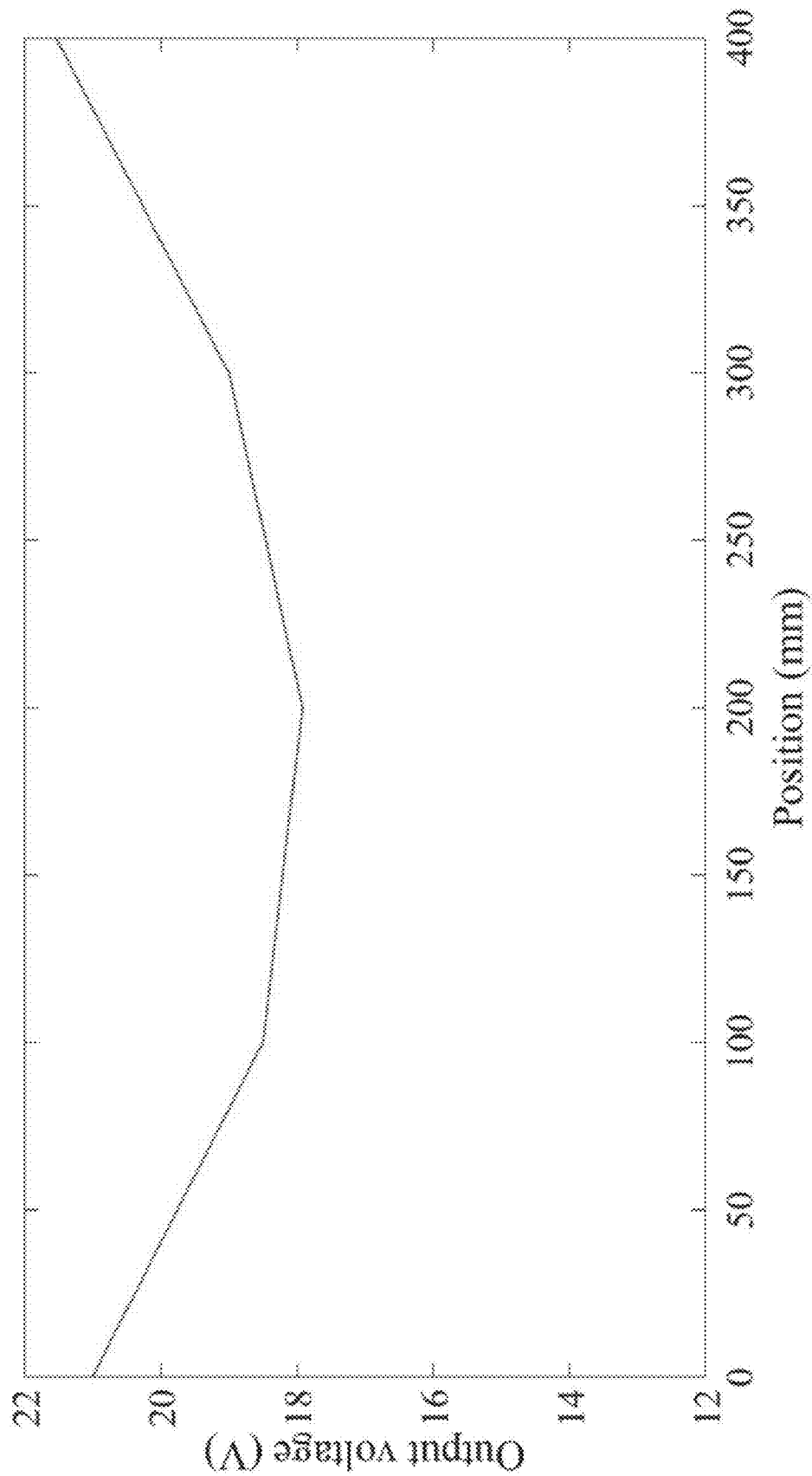
FIG. 18(b) shows the corresponding output voltages at each position, according to an embodiment of the subject invention.

In addition, it is noted that the reference position in the experimental setup is the distance between the left edges of the receiver coil and the first main transmitter coil, with motion moving from left to right in the vertical direction. FIGS. 18(a) and 18(b) illustrate the physical visualization of various positions and the corresponding output voltage at each position, respectively. The table in FIG. 21 provides a comparison between this work and state-of-the-art works.

According to the embodiments of the subject invention, a novel method and systems to mitigate voltage fluctuations in Dynamic Wireless Power Transfer (DWPT) systems are developed, involving small auxiliary coils, or 'assisted coils,' placed between adjacent transmitter coils. These coils effectively stabilize the output voltage, particularly during transitions between the main transmitter coils, with minimal cross-coupling between the assisted and transmitter coils. The design strategy optimizes the dimensions of the assisted coils and the ratio between the LCC compensation inductors of the main and assisted coils, ensuring stable voltage at various positions. Experimental results demonstrate the effectiveness of this approach, showing a maximum 8.4% drop in output voltage during transitions between adjacent main transmitter coils. Compared with the conventional technology, the output voltages of the DWPT methods and systems of the embodiments of the subject invention exhibit a 55.06% improvement during the transitions.

Structural Parameters of the Assisted Coil and Compensation Network

The parameters of the assisted coil structure and its corresponding compensation network are optimized. The following ranges and preferred embodiments are evaluated, demonstrating robust performance and reasonable generalizability:

A. Assisted Coil Length

The outer length of the assisted coil ($l_{ao}$) is preferably configured to substantially match that of the main transmitter coils. In a preferred embodiment, $l_{ao}$ is approximately 300 mm. However, $l_{ao}$ may be extended or reduced as required to correspond with the length of the main transmitter coils in various applications.

B. Assisted Coil Width

The outer width of the assisted coil ($w_{ao}$) is significantly smaller than that of the main transmitter coils. This configuration minimizes copper usage and reduces losses within the DWPT system. To compensate for the reduced size of the assisted coils, a compensation inductor ratio between the main and assisted coils is introduced, as further detailed below. In one embodiment, the outer width of the assisted coil is approximately 50 mm, which corresponds to approximately one-sixth (⅙) of the width of the main transmitter coils (for example, 300 mm).

C. Assisted Coil Length Ratio ($r_x = l_{ai}/l_{ao}$)

The assisted coil length ratio ($r_x$), defined as the inner length of the assisted coil ($l_{ai}$) divided by the outer length of the assisted coil ($l_{ao}$), has been simulated within the range of 0.6 to 0.8. The optimal performance has been observed at a ratio of 0.6. This ratio can be extended within a range of approximately 0.5 to 0.9, depending on the specific geometric and magnetic constraints of a given application.

D. Assisted Coil Width Ratio ($r_y = w_{ai}/w_{ao}$)

The assisted coil width ratio ($r_y$), defined as the inner width of the assisted coil ($W_{ai}$) divided by the outer width of the assisted coil ($w_{ao}$), has been evaluated within the range of 0.6 to 0.9. A ratio of 0.6 yielded the most stable output in testing. This parameter may be further adjusted, provided that cross-coupling between the assisted coil and the main transmitter coil remains minimal to ensure system efficiency.

E. Number of Turns in Assisted Coil ($n_a$)

Simulations have been conducted for assisted coils having 3 and 4 turns, both configurations demonstrating effectiveness. The approach is scalable to other numbers of turns based on inductance requirements and available spatial constraints. It is noted that, due to the compact size of the assisted coil, implementing an excessively high number of turns is generally impractical and undesirable, as it can lead to increased losses.

F. Compensation Inductor Ratio ($r_{Lf} = L_{fp}/L_{fa}$)

The compensation inductor ratio ($r_{Lf}$), defined as the inductance of the primary compensation inductor ($L_{fp}$) divided by the inductance of the assisted coil compensation inductor ($L_{fa}$), has been analyzed over a range from 9 to 11. A ratio of 9 resulted in the most stable voltage output. This ratio is inherently design-dependent and can be optimized for various DWPT system configurations. The selection of $r_{Lf}$ is critically tied to the desired output voltage profile across different vehicle positions, as it plays a significant role in minimizing voltage fluctuations during dynamic vehicle movement.

G. Mutual Inductance Between Main and Assisted Coils

The mutual inductance between the main transmitter coils and the assisted coil has been found to be in the range of approximately −480 nH to −630 nH, depending on the specific geometric configuration. It is crucial to maintain the cross-coupling between the main transmitter coils and the assisted coil at a minimal level, as excessive cross-coupling negatively affects the overall performance and efficiency of DWPT systems.

Operating Parameters

The following operating parameters are considered during testing and are broadly applicable across a range of DWPT scenarios:

A. Operating Frequency

The system is designed to operate with an operating frequency centered at 85 kHz. The design has demonstrated effectiveness across small variations, typically within ±1 kHz to ±2 kHz of the center frequency. This frequency range ensures compatibility with industry standards, such as SAE J2954.

B. Air Gap

The air gap is set to approximately 150 mm. This value is based on common electric vehicle ground clearance specifications. It is understood that this value may vary depending on the specific electric vehicle models and their respective clearances.

When ranges are used herein, combinations and subcombinations of ranges (e.g., any subrange within the disclosed range) and specific embodiments therein are intended to be explicitly included. When the term "about" or "approximately" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method for a dynamic wireless power transfer (DWPT) system to charge an electric vehicle in motion, the method comprising:
   transmitting wireless power from a plurality of main transmitter coils;
   transmitting wireless power from one assisted coil disposed between each pair of adjacent main transmitter coils of the plurality of main transmitter coils;
   receiving the wireless power at a receiver coil when the electric vehicle is charged in motion;
   providing a primary compensation network coupled to the plurality of main transmitter coils and the assisted coils; and
   compensating for reactive power at a secondary side by a secondary compensation network coupled to the receiver coil,
   dimensions and positions of the assisted coils and parameters of the compensation network being configured to maintain a substantially constant mutual inductance profile between the transmitter coils and the receiver coil when the electric vehicle is charged in motion, thereby reducing power pulsation and providing a stable output voltage to a battery of the electric vehicle, the method further comprising optimizing dimensions of the assisted coils to minimize voltage fluctuations and reduce cross-coupling between the main transmitter coils and the assisted coils, and the optimizing of the dimensions comprising:
  defining a length ratio between the inner length and the outer length of the assisted coil and defining a width ratio between the inner width and the outer width of the assisted coil,
  searching the length ratio in a first predetermined range and searching the width ratio in a second predetermined range; and
  determining an optimized set of the length ratio and the width ratio that produces least fluctuation in output voltage of the DWPT system.

2. The method according to claim 1, further comprising optimizing a ratio between an inductance of a compensation network for the main transmitter coils and an inductance of a compensation network for the assisted coils to minimize fluctuation in output voltage of the DWPT system.

3. The method according to claim 2, a value of the ratio between the inductance of the compensation network for the main transmitter coils and the inductance of the compensation network for the assisted coils ($r_{Lf}$) being in a range of 9 and 11.

4. The method according to claim 1, further comprising optimizing a number of turns in the assisted coils to reduce output voltage fluctuations of the DWPT system.

5. The method according to claim 4, an optimal value of the number of turns in the assisted coils being 3 or 4.

6. A wireless power transfer system for dynamic charging of an electric vehicle, the wireless power transfer system comprising:
  a plurality of main transmitter coils;
  one assisted coil disposed between each pair of adjacent main transmitter coils of the plurality of main transmitter coils;
  a receiver coil configured to inductively couple with the main transmitter coils and the assisted coils; and
  a plurality of compensation networks respectively coupled to each of the plurality of main transmitter coils and the assisted coils,
  dimensions and positions of the assisted coils and parameters of the primary compensation network being configured to provide a substantially constant mutual inductance profile when the electric vehicle is charged in motion, thereby reducing power pulsation and providing a stable output voltage to a battery of the electric vehicle,
  the dimensions of the assisted coils being optimized to minimize voltage fluctuations and reduce cross-coupling between the main transmitter coils and the assisted coils,
  each assisted coil having a length ration (rx) and a width ratio (ry), and
  a value of the length ratio (rx) being in a range of 0.5 to 0.9, and a value of the width ratio (ry) being in a range of 0.6 to 0.9, to minimize fluctuation in output voltage of the wireless power transfer system.

7. The system according to claim 6, each compensation network of the plurality of compensation networks being a LCC compensation network.

8. The system according to claim 7, a ratio between an inductance of the LCC compensation network of the main transmitter coils and an inductance of the LCC compensation network of the assisted coils being optimized to minimize fluctuation in output voltage.

9. The system according to claim 8, a value of the ratio between the inductance of the LCC compensation network of the main transmitter coils and the inductance of the LCC compensation network of the assisted coils ($r_{Lf}$) being in a range of 9 and 11.

10. The system according to claim 6, a number of turns in the at assisted coils being optimized to reduce output voltage fluctuations.

11. The system according to claim 10, an optimal value of the number of turns in the assisted coils being 3 or 4 for minimizing output voltage fluctuation.

12. The system according to claim 6, further comprising an inverter at an input side configured to generate high frequency for the plurality of main transmitter coils.

13. The system according to claim 12, the plurality of compensation networks being disposed between the inverter and the plurality of main transmitter coils and the assisted coils to reduce reactive power and realize the soft-switching.

14. A method for optimizing a design of a dynamic wireless power transfer (DWPT) system for charging an electric vehicle in motion, the DWPT system including a plurality of main transmitter coils, one assisted coil disposed between each pair of adjacent main transmitter coils of the plurality of main transmitter coils, and a plurality of compensation networks respectively coupled to each of the plurality of main transmitter coils and the assisted coils, the method comprising following steps:
  (a) defining parameters of the main transmitter coils;
  (b) defining an outer length and an outer width of the assisted coils and defining an inner length and an inner width of the assisted coils;
  (c) defining a length ratio between the inner length and the outer length of the assisted coils and defining a width ratio between the inner width and the outer width of the assisted coils;
  (d) searching the length ratio in a first predetermined range and searching the width ratio in a second predetermined range;
  (e) during the step (d) of searching, determining an optimized set of the length ratio and the width ratio that produces least fluctuation in output voltage of the DWPT system;
  (f) determining whether the optimized set of the length ratio and the width ratio produces minimal cross-coupling between the main transmitter coils and the assisted coils;
  (g) if the condition of step (f) is not satisfied, go back to step (e);
  (h) if the condition of step (f) is satisfied, performing finding an optimized number of turns in the assisted coil until the least fluctuation in the output voltage of the DWPT system is obtained;
  (i) defining a ratio between compensation inductor of the main transmitter coils and compensation inductor of the assisted coils; and
  (j) performing searching for an optimized set of the length ratio and the width ratio that produces least fluctuation in output voltage of the DWPT system.

15. The method according to claim 14, the first predetermined range being between in a range of from 0.6 to 0.8.

16. The method according to claim 14, the second predetermined range being between in a range of from 0.6 to 0.9.

\* \* \* \* \*